(12) United States Patent
Townley et al.

(10) Patent No.: US 12,090,391 B2
(45) Date of Patent: Sep. 17, 2024

(54) VIDEO GAMING SYSTEM

(71) Applicant: T2M, INC., Golden Valley, MN (US)

(72) Inventors: Fraser Townley, Pembroke, MA (US); Lee Chin Feng, New Taipei (TW); Daniel Paul Dooley, Oklahoma City, OK (US)

(73) Assignee: T2M, INC, Golden Valley, MN (US)

( * ) Notice: Subject to any disclaimer, the term of this patent is extended or adjusted under 35 U.S.C. 154(b) by 0 days.

(21) Appl. No.: 18/366,364

(22) Filed: Aug. 7, 2023

(65) Prior Publication Data

US 2024/0123334 A1 Apr. 18, 2024

Related U.S. Application Data

(63) Continuation-in-part of application No. 17/965,463, filed on Oct. 13, 2022, now Pat. No. 11,865,437.

(51) Int. Cl.
*A63F 13/23* (2014.01)
*A63F 13/214* (2014.01)
*A63F 13/22* (2014.01)
*A63F 13/285* (2014.01)

(52) U.S. Cl.
CPC ............ *A63F 13/23* (2014.09); *A63F 13/214* (2014.09); *A63F 13/22* (2014.09); *A63F 13/285* (2014.09)

(58) Field of Classification Search
CPC ........ A63F 13/23; A63F 13/214; A63F 13/22; A63F 13/285
See application file for complete search history.

(56) References Cited

U.S. PATENT DOCUMENTS 7,833,097 B1 11/2010 Maddox et al.
11,103,774 B2 * 8/2021 Black ...................... A63F 13/98

FOREIGN PATENT DOCUMENTS

WO 2022067344 3/2022

OTHER PUBLICATIONS https://www.amazon.com/Version-GameSir-Gamepad-Controller-PlayStation-one/dp/B08RJ2NWQ7, accessed 07/11/201 (screenshots provided as NPL 1).
https://www.youtube.com/watch?v=q-SK-mt2WBM, accessed Jun. 23, 2021 (screenshots provided as NPL 2).
https://www.amazon.com/Wireless-Controller-Vibration-Compatible-10%EF%BC%88Black%EF%BC%89/dp/B08XYWC1R4, accessed Jul. 11, 2021 (screenshots provided as NPL 3).

* cited by examiner

*Primary Examiner* — Peter J Iannuzzi

(57) ABSTRACT

A device, includes a first user input and a digital switch coupled to the first user input, wherein the digital switch in operation generates a first signal in response to a first user interaction with the first user input. The device also includes a second user input and an analog position encoder switch coupled to the second user input, wherein the digital switch in operation generates a second signal in response to a second user interaction with the second user input. The device also includes a touch input disposed on a rear face of the device, wherein the touch input is selectively programmable to correspond to one of the first user input or the second user input.

20 Claims, 33 Drawing Sheets

VIDEO GAMING SYSTEM

CROSS-REFERENCE TO RELATED APPLICATIONS

The present application is a continuation-in-part of U.S. patent application Ser. No. 17/965,463, entitled "Video Gaming System", filed Oct. 13, 2022, which is herein incorporated by reference.

BACKGROUND OF THE INVENTION

The present invention is broadly concerned with gaming systems, and more particularly, mobile and cloud video gaming systems. As improvement in telecommunication technologies continue to progress, there has been a shift in how users utilize their computing devices, and particularly how users utilize their smart phones. Historically, users have enjoyed playing video games on either specialized, limited purpose counsel gaming systems, or personal computers. In either case, lack of mobility of these systems has been a drawback, i.e. an inability to enjoy playing video games selected from thousands of available video games anytime and anywhere has not been an option. With the advancements in telecommunication and Wi-Fi enabled mobile computing devices with enhanced computing power, such as smart phones, and increased bandwidth in wireless phone services, there has been a shift in the video gaming industry from fixed location gaming to mobile gaming as well as cloud gaming. As this shift has occurred, a demand for improved characteristics of mobile video game controllers has emerged, most particularly, improvements in ergonomics and/or interface capabilities.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 56 further shows partial cutaway revealing that the smart device holder provides a retention barb, the controller chassis provides a retention aperture. The retention aperture interacts with the retention barb to maintain the smart device holder removably secured to the controller chassis.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 23:
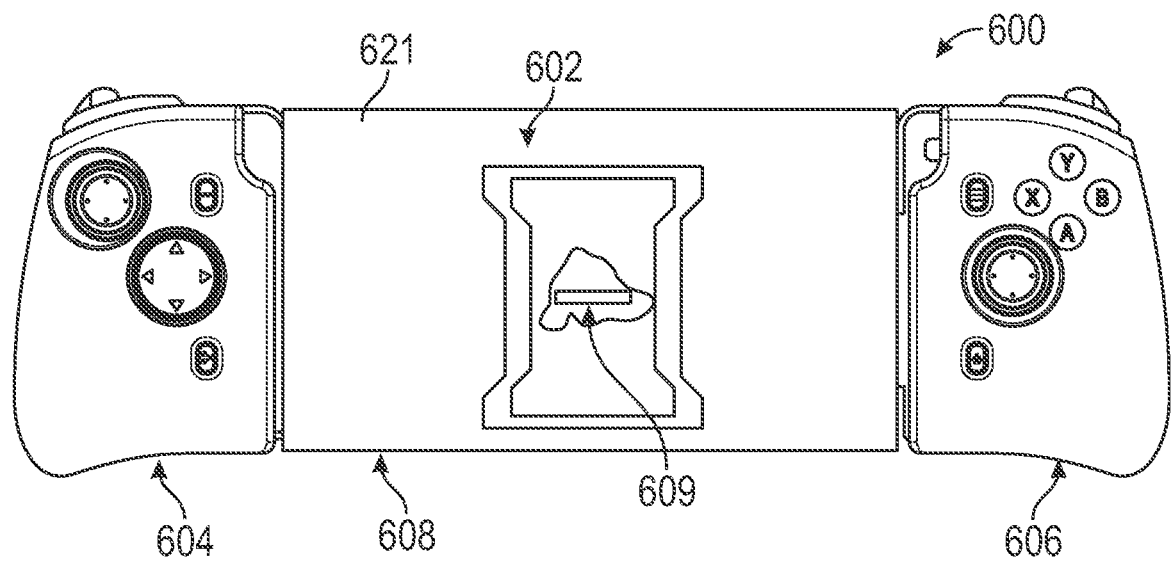
FIG. 23 shows a front plan view of a video game controller that supports a smart device holder, the smart device holder is shown in a retracted position.

The present disclosure generally relates to a video gaming system, which utilizes a video game controller in electronic communication with a computing device, also referred to herein as a smart device. Smart devices include, but are not limited to: smart phones, mini tablet computers, tablet computers as well as Wi-Fi enabled television sets. Preferably, the smart device includes an electronic video game loaded on to a processor of the smart device when the video gaming system is configured to play a video game. As those skilled in the art further clearly recognize that input signals, generated by the video game controller, in response to an input action provided by a user of the video gaming system, causes a visual or audio response by the electronic video game, which is displayed on a display associated with the smart device or delivered by way of a speaker associated with the smart device. Accordingly, it is inherent that an operational video gaming system operates by way of a video game software program loaded into a memory portion of the smart device that interacts with the processor of the smart device. Further, for most video gaming systems, the video game controller preferably includes a processor, which manages the functions of the video game controller and interfaces with the processor of the smart device. For the convenience of skilled artisans, sign lines used in the accompanying drawings import a meaning. A sign line that provides a solid arrow and is accompanied by an underlined, bold text has the meaning of referring to the item in the drawing figure in its totality. As an example, FIG. 23 includes a sign number 600, which is shown in a bold, underlined text associated with a sign line having a solid bold arrow and is referring to an invention in its totality, i.e., a video gaming system 600 (also referred to herein as a video gaming controller 600). FIG. 23 further shows non-bold sign numbers associated with arrowed non-bold sign lines. This presentation designates an assemble level item included within the invention in its totality, such as, a pair of video game controller input modules 604 and 606, or of a feature such as video game controller input module retention notch 910 of FIG. 46. A non-bold sign number associated with a non-arrowed sign line designates a component level item such the rigid, non-expandable bridge section 608 of FIG. 23.

Figure 1:
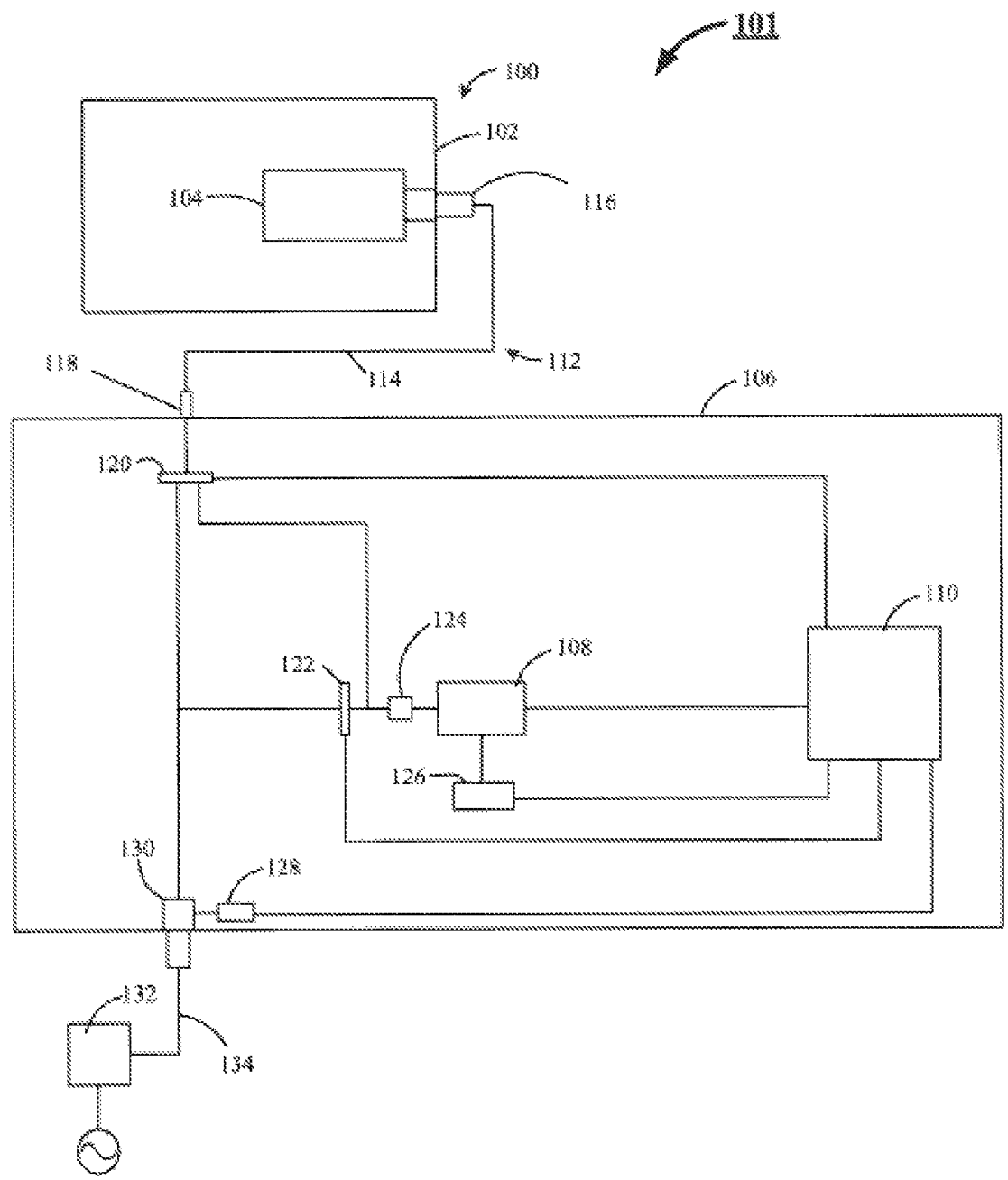
FIG. 1 is a block diagram of an embodiment of a video gaming system.

Turning to the drawings. FIG. 1 shows a power management and power pass through circuit 100 ("PMPP") of a first embodiment of a video gaming system 101. Said video gaming system 101, includes at least, but is not limited to, a computing device 102, which provides at least a first energy storage device 104. The computing device 102 communicates with a video game controller 106, said video game controller 106 provides at least, but is not limited to, a second energy storage device 108 and a processor 110.

Said PMPP 100 precludes a simultaneous bidirectional current flow between said computing device 102 and said video game controller 106.

In a preferred embodiment, the communication between the computing device 102 and the video game controller 106 is achieved via a wired connection circuit 112, however as one skilled in the art understands, communication between the computing device 102 and the video game controller 106 may be achieved wirelessly. The wired connection circuit 112 preferably includes a power and signal cable 114 (also referred to herein as cable 114). Cable 114 preferably provides a connector 116, which is specifically configured to interface with an interface connector 118, said interface connector 118 provides a predetermined number of contacts including, but not limited to, a power contact and a ground contact.

As further shown by FIG. 1, the video game controller 106 further provides at least, but not by way of a limitation: a first current flow control circuit 120; a second current flow control circuit 122; a unidirectional current flow circuit 124; a battery charge control circuit 126; a voltage present detection circuit 128; and an interface connector 130. In a preferred embodiment, said interface connector 130 presents a structurally similar structure to the interface connector 118. The PMPP 100 still further preferably includes a computing device charger 132, and a charge cord 134. In a preferred embodiment, during operation of the video gaming system, the first energy storage device 104 is connected in parallel with the second energy storage device 108 of the video game controller 106. The first energy storage device 104 and the second energy storage device 108 of the video game controller are of a common voltage but are typically of different capacities.

Further in a preferred operating mode, when the computing device 102 is activated and no voltage is detected by the voltage present detection circuit 128, the first current flow control circuit 120 is set to provide power from the first energy storage device 104 of the computing device 102 to the processor 110 by way of the unidirectional current flow circuit 124 and the second energy storage device 108. While the second current flow control circuit 122 is set to preclude power passage from the computing device charger 132 to the processor 110. When voltage is detected by the voltage present detection circuit 128, the first current flow control circuit 120 is set to preclude power from the first energy storage device 104 to the processor 110. The first energy storage device 104 is simultaneously set to receive power from the computer device charger 132 for charging the first energy storage device 104, which in a preferred embodiment is, but not by limitation, a battery. While the first energy storage device 104 is being charged, the second energy storage device 108, provides power to the processor 110 and the second current flow control circuit 122 is set to preclude power passage from the computing device charger 132 to the second energy storage device 108. However, during a charge cycle of the first energy storage device 104, and when the battery charge control circuit 126 detects the charge level of the second energy storage device 108 to be at a first predetermined (e.g., lower) threshold, the battery charge control circuit 126 signals the processor 110, which in turn signals the second current flow control circuit 122 to change state from precluding power transfer from the computing device charger 132 to the second energy storage device 108, to enabling power transfer from the computing device charger 132 to the second energy storage device 108. During the charge process of the second energy storage device 108, when the battery charge control circuit 126 detects the charge level of the second energy storage device 108 to be at a second predetermined (e.g., high) threshold, the battery charge control circuit 126 signals the processor 110, which in turn signals the second current flow control circuit 122 to change state from enabling power transfer from the computing device charger 132 to the second energy storage device 108 to precluding power transfer from the computing device charger 132 to the second energy storage device 108. In a preferred embodiment, the unidirectional current flow circuit 124 precludes passage of current from the second energy storage device 108 to the first energy storage device 104. It is known by those skilled in the art that a specifically designed Zener Diode will fulfill this task by preventing voltage of said second energy storage device 108 (such as a battery or specialized capacitor) from being conducted to either said first energy storage device 104 or said interface connector 130. As will be appreciated by those skilled in the art, at least a portion of the functions being carried out by the PMPP 100 described hereinabove may be carried out through the use of an ASIC (application specific integrated circuit), programed to carry out the functions disclosed herein above, and interacting with processor 110.

Figure 2:
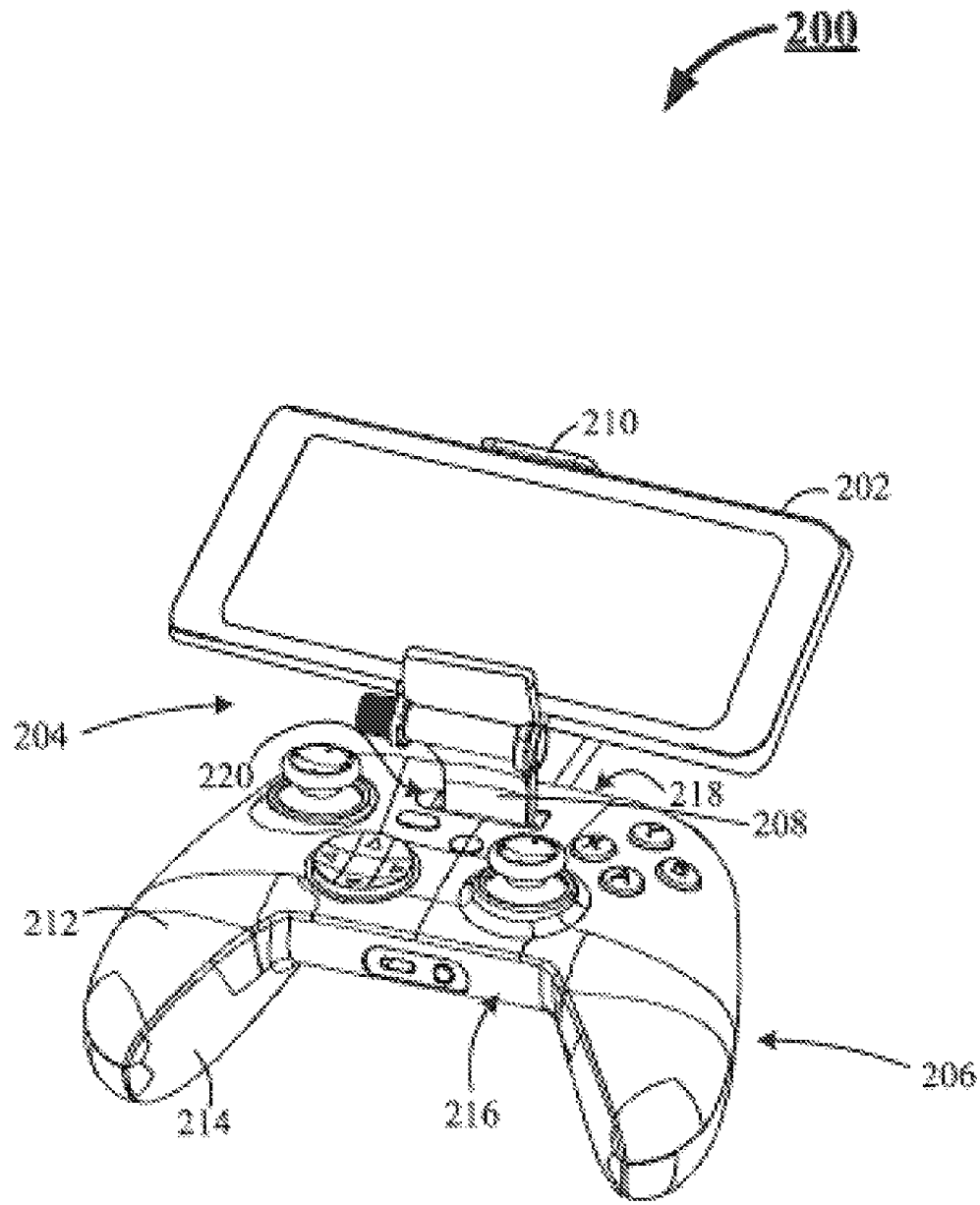
FIG. 2 shows a perspective view of a second embodiment of the video gaming system.

FIG. 2 shows a perspective view of a second embodiment of the video gaming system 200. The video gaming system 200 preferably includes at least a computing device 202 supported by a stand 204 above a video game controller 206. In a preferred embodiment the stand 204 includes a support portion 208 linked to a cradle portion 210. The cradle portion 210 confines and secures the computing device 202 during a user's operation of the video gaming system 200.

The video game controller 206 is in electronic communication with said computing device 202, and includes at least, but is not limited to, a cover portion 212 and a base portion 214. The cover portion 212 when secured to the base portion 214 forms a video game controller housing 216 (also referred to herein as controller housing 216). The cover portion 212 provides a front edge 218, and an aperture 220 offset from the front edge 218.

Figure 3:
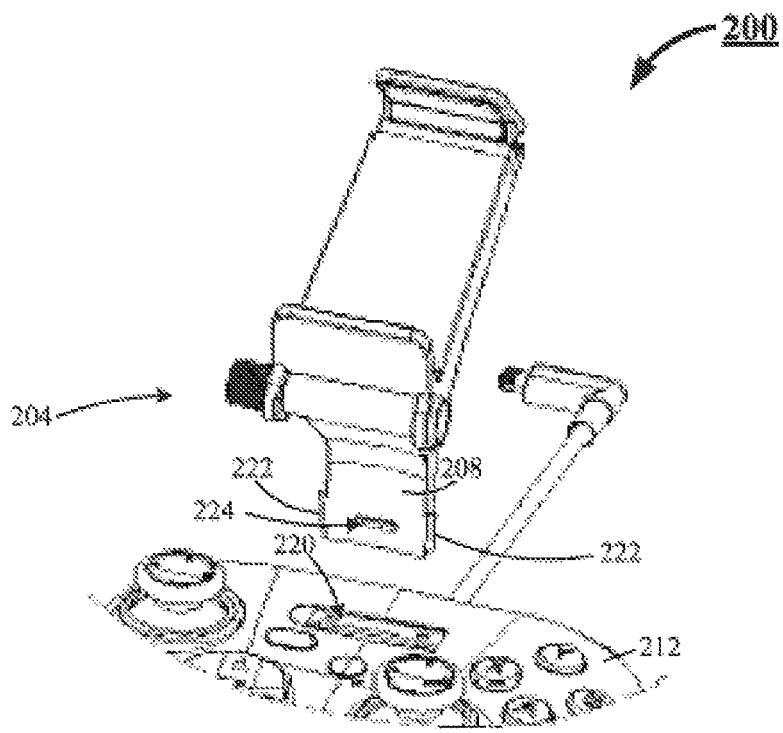
FIG. 3 illustrates a partial cutaway top perspective view of the second embodiment of the video gaming system of FIG. 2, constructed in accordance with various embodiments disclosed and claimed herein.
Figure 5:
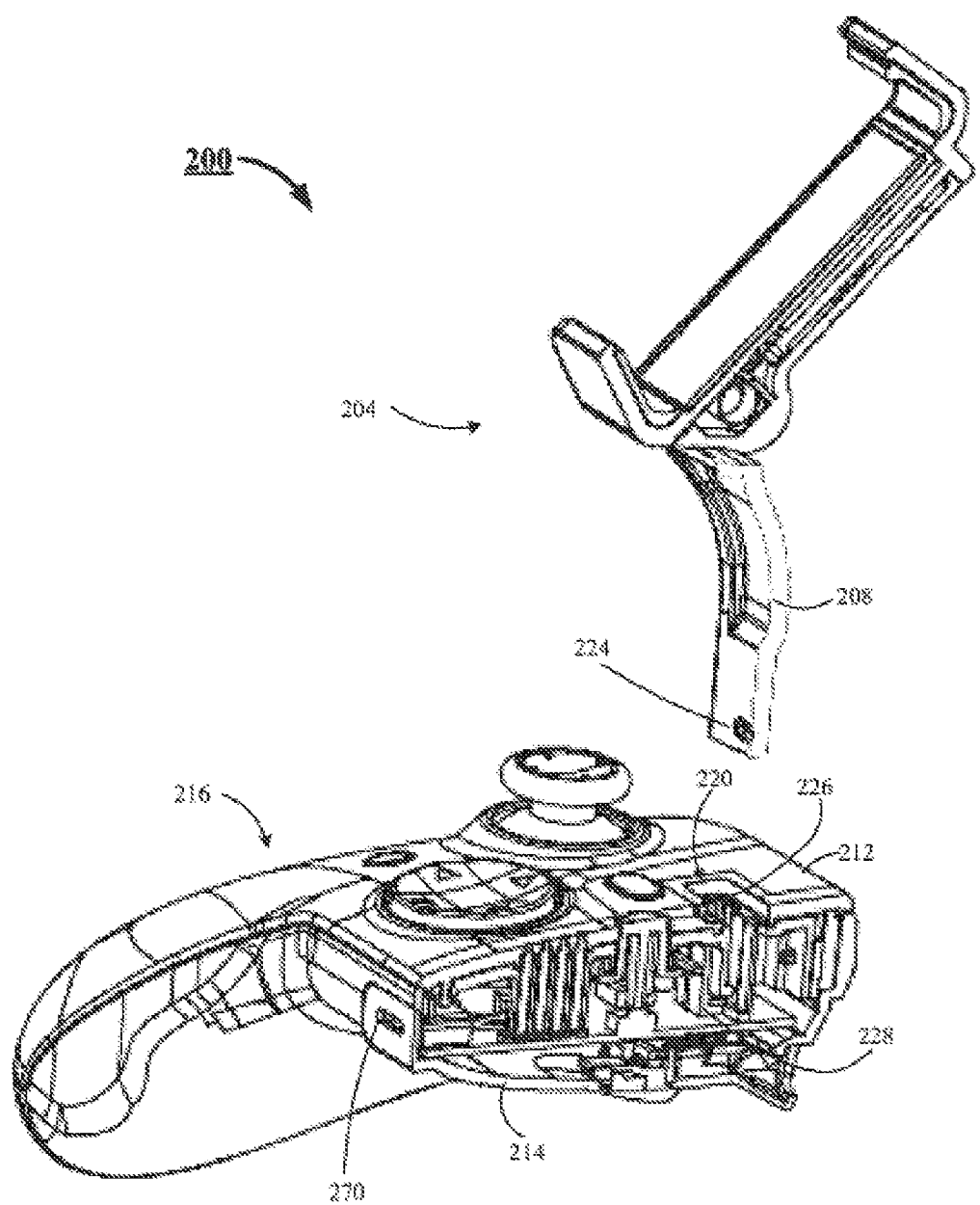
FIG. 5 shows a left side partial cutaway view in elevation of the second embodiment of the video gaming system of FIG. 2.

FIG. 3 shows the support portion 208 of the stand 204 further preferably provides a boss 222 and a pocket 224. In this preferred embodiment, as shown by FIG. 5, the aperture 220 is configured to confine and promote passage of the support portion 208 through the cover portion 212. And as shown by FIG. 5, the base portion 214 provides a retention pocket 226 and a retention boss 228. Boss 222 (of FIG. 3) interacts with retention pocket 226, the interaction between boss 222 and retention pocket 226 constrains the support portion 208, within the aperture 220. The interaction of pocket 224 and retention boss 228, mitigates an inadvertent removal of the support portion 208 from aperture 220. It is noted that in this second embodiment of the video gaming system 200, the stand 204 is removably secured to the video game controller housing 216 absent the use of hardware, that is the stand 204 is manually pushed into the aperture 220 to install the stand 204 to the video game controller housing 216, and manually pulled out of the aperture 220 to uninstall the stand 204 from the video game controller housing 216.

Figure 4:
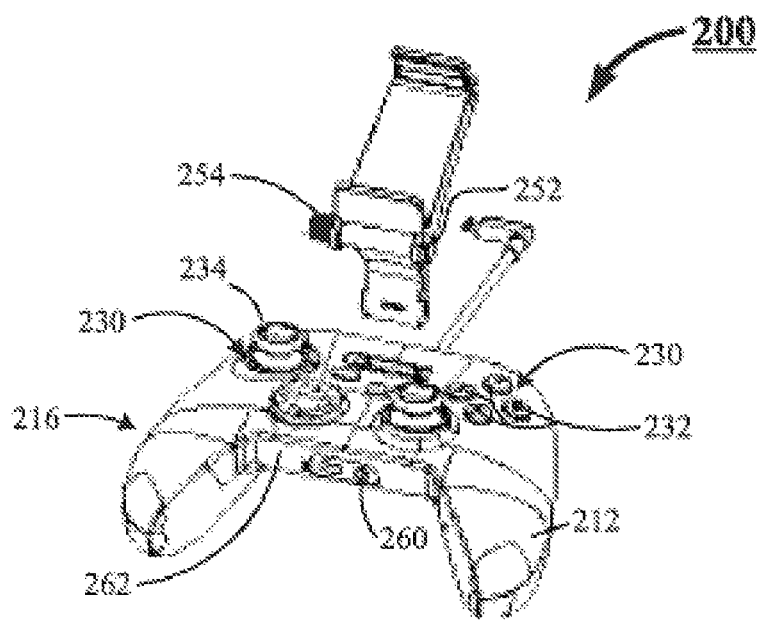
FIG. 4 is a top perspective view of the second embodiment of the video gaming system of FIG. 2.

FIG. 4 further shows a top perspective view of the video gaming system 200, in which the cover portion 212, provides a plurality of input button apertures 230 which facilitates an interaction by the user with a plurality of input buttons 232 and a joystick 234. Each input button 232 is confined by its corresponding input button aperture 230, and the joystick 234 is confined by its corresponding input button aperture 230.

Figure 7:
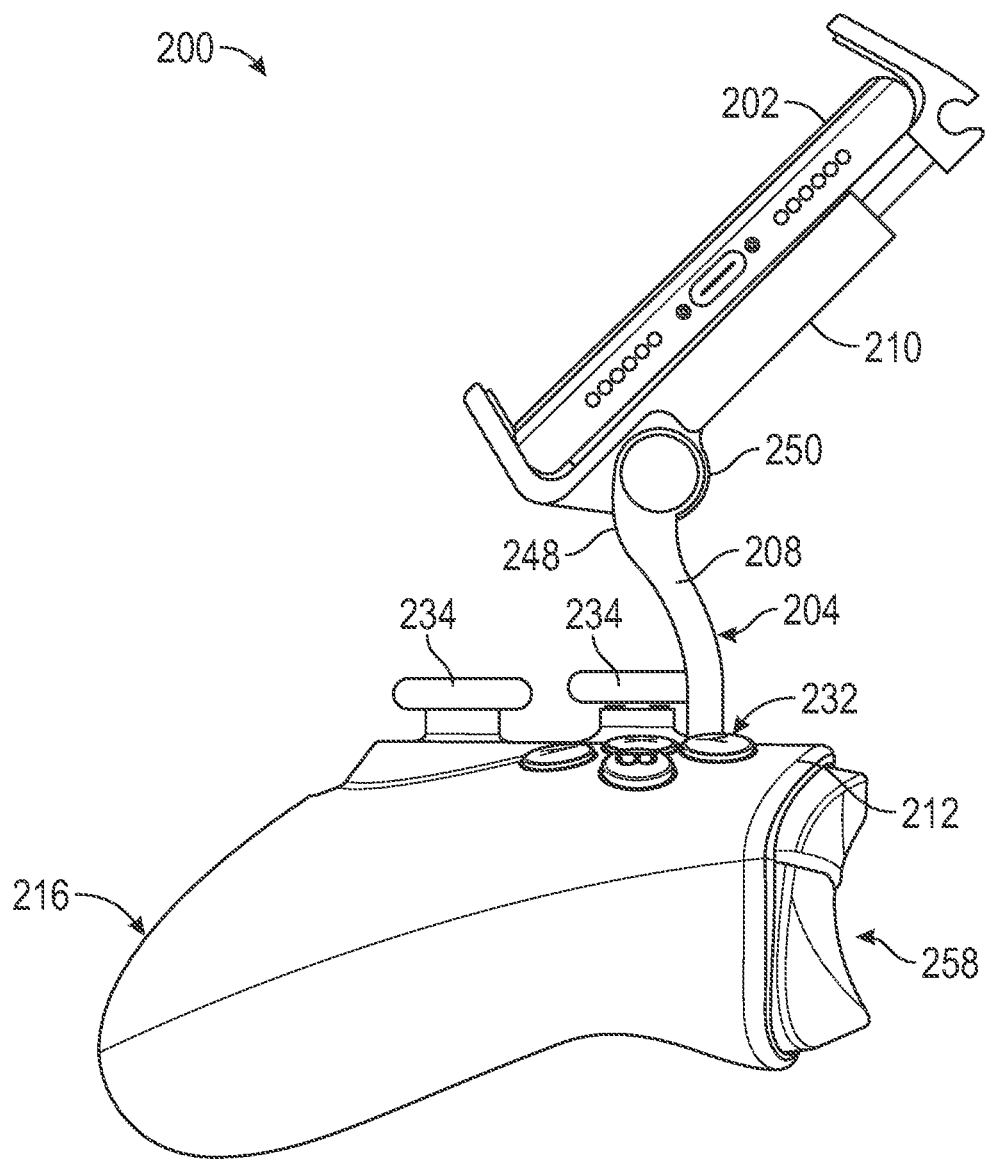
FIG. 7 displays a right-side view in elevation of the second embodiment of the video gaming system of FIG. 2.
Figure 8:
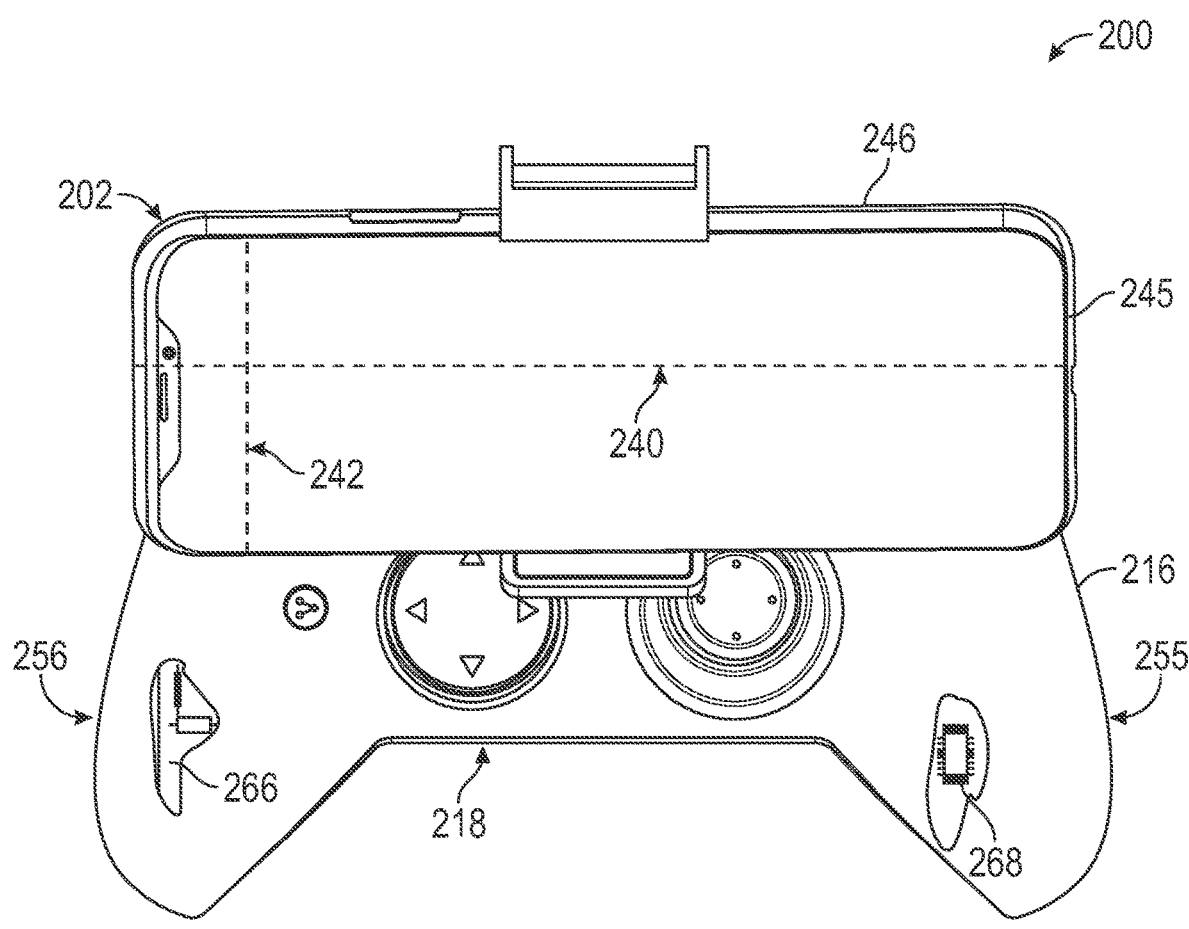
FIG. 8 depicts a top plan view of the second embodiment of the video gaming system of FIG. 2.

As shown by FIG. 7, when the computing device 202 is confined by the cradle portion 210, and the stand 204 is secured by the controller housing 216, the computer device 202 overhangs at least a portion of the cover portion 212 and visually obscures a number of the plurality of input buttons 232 and the joystick 234, when the user is viewing the (mobile) video gaming system 200 from a top plan view vantage point as shown by FIG. 8.

FIG. 8 further shows the computing device 202 has a length 240, greater than its width 242, and a display screen 245 secured to a back 246, and in which the stand 204 (of FIG. 7) is manually removably secured to the controller housing 216 upon full engagement of the support portion within the aperture 220 (of FIG. 4).

Returning to FIG. 7, the support portion 208 provides a hinge member 248, which corresponds to, and is in contact adjacency with, a hinge member 250 of the cradle portion 210. The corresponding hinge members (248 & 250) are linked one to the other by way if a hinge pin 252 (of FIG. 4). The hinge pin 252 promotes an articulation of the cradle portion 210 relative to the support portion 208. The hinge pin 252 interacts with provided mechanical hardware 254 (of FIG. 4) such that when a desired angle between said support portion 208 and said cradle portion 210 is selected, the mechanical hardware 254 is engaged to maintain said desired angle between the support portion 208 and the cradle portion 210. As further shown by FIG. 8, the controller housing 216 provides both right-side and left-side input module portions (255 & 256 respectively). Each of the input module portions (255 & 256) hosts, as shown by FIG. 7, a plurality of input mechanisms including, but not limited to, buttons 232, joysticks 234, and triggers 258.

Figure 6:
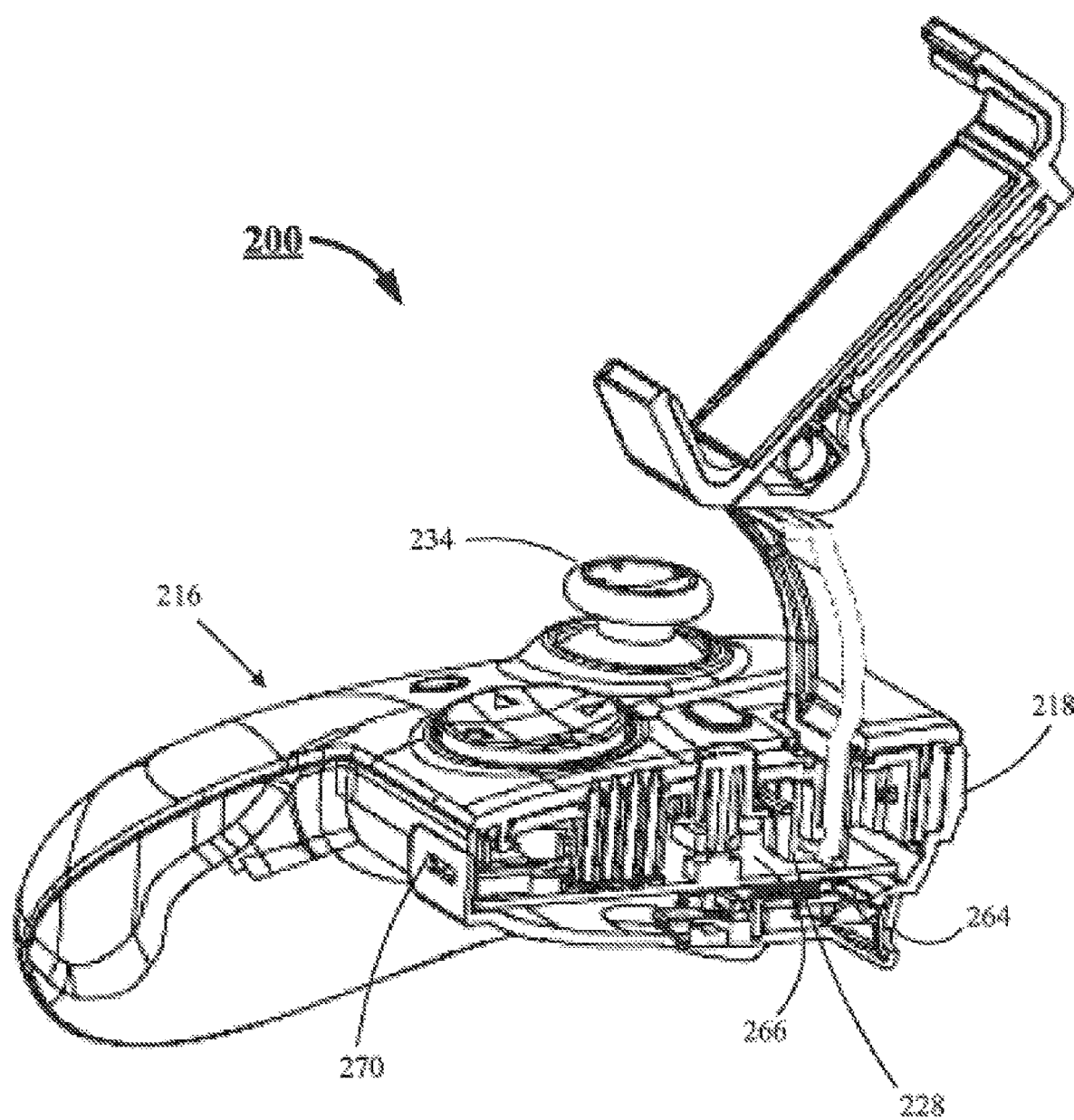
FIG. 6 displays a left side partial cutaway view in elevation of the second embodiment of the video gaming system of FIG. 2.

Returning to FIG. 4, shown therein is an audio signal input/output port 260 arranged at a transversal portion 262 of said controller housing 216, said audio signal input/output port 260 is separate and distinct from a combined power input and audio signal input/output port 264 (of FIG. 6) positioned on said front edge 218 (of FIG. 6).

Additionally, FIG. 6 shows a printed circuit board assembly 266. The printed circuit board assembly 266 is housed within the video game controller housing 216. In this preferred embodiment, the printed circuit board assembly 266 (of FIG. 8) provides a gaming processor 268 (of FIG. 8). The gaming processor 268 is in electrical communication with: management and power pass through PMPP 100 (of FIG. 1), said power management and power pass through PMPP 100 communicating with said power input port 270.

Figure 9:
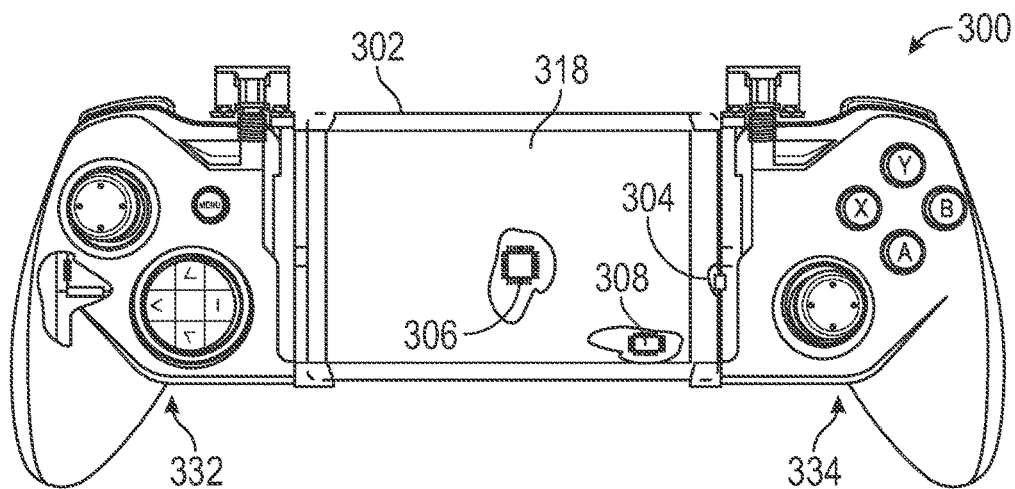
FIG. 9 depicts a plan view of a third embodiment of the video gaming system.

FIG. 9 shows a front view in elevation of a third embodiment of a video gaming system 300. The video gaming system 300, includes at least, but not limited to, a computing device 302. The computing device 302 provides at least a combined audio and data input/output port 304, as well as a processor 306, and a transceiver device 308. The processor 306 in electrical communication with each the combined audio and data input/output port 304, and the transceiver device 308. The computing device 302 further provides a display screen 318, and a back cover 320 (of FIG. 11). The back cover 320, encloses the processor 306 and is secured to the display screen 318. The securement of back cover 320 to the display screen 318 forms an enclosed edge 322 (of FIG. 11) around a perimeter 324 (of FIG. 10) of the computing device 302. The perimeter 324 includes at least two opposing sides 326 & 328, respectfully, of FIG. 10.

Figure 10:
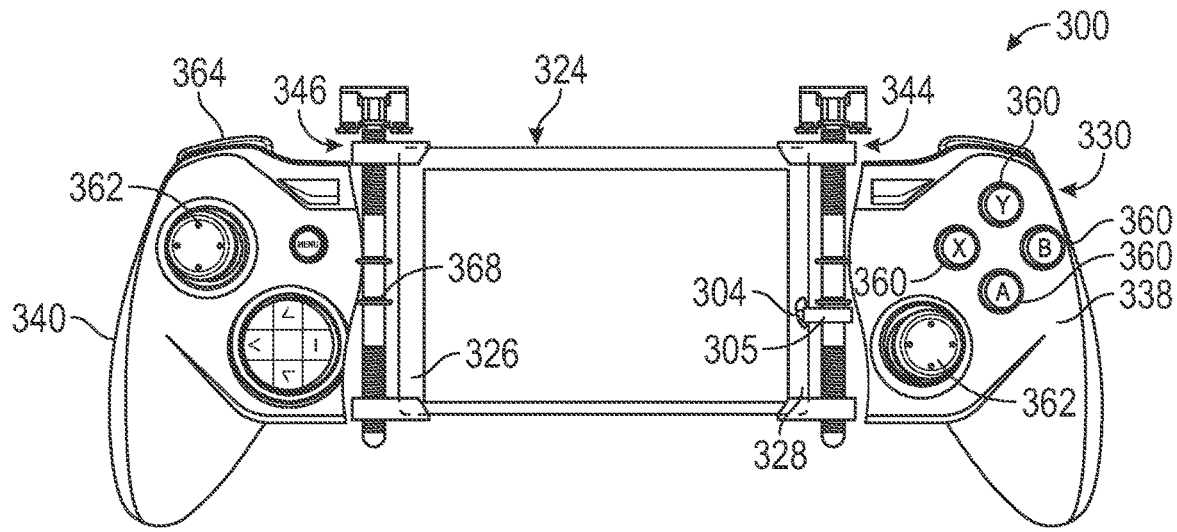
FIG. 10 illustrates a plan view of the third embodiment of the video gaming system depicting a partial cutaway revealing a clamp assembly of each of a pair of input modules of an electronic game control of the video gaming system of FIG. 9.

FIG. 10 additionally shows that the video gaming system 300, preferably further includes a bridgeless video game controller 330 in electronic communication with the processor 306 (of FIG. 9). In this preferred embodiment, the bridgeless video game controller 330 provides a pair of video game control modules 332 & 334 (of FIG. 9) respectfully. Each video game control module 332 or 334 is secured to a side of the two opposing sides 326 & 328, and each video game control module (332 or 334) is supported by the computing device 302, rather than the pair of video game control modules 332 & 334 supporting the computing device 302.

Figure 16:
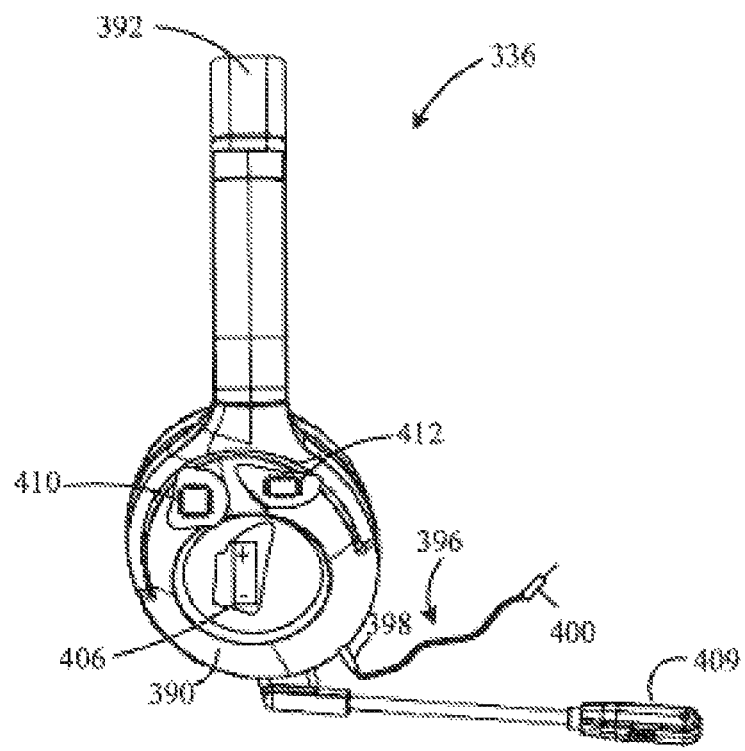
FIG. 16 shows a left side elevation view of a gaming headset configured to interact with the third embodiment of the video gaming system of FIG. 9.
Figure 17:
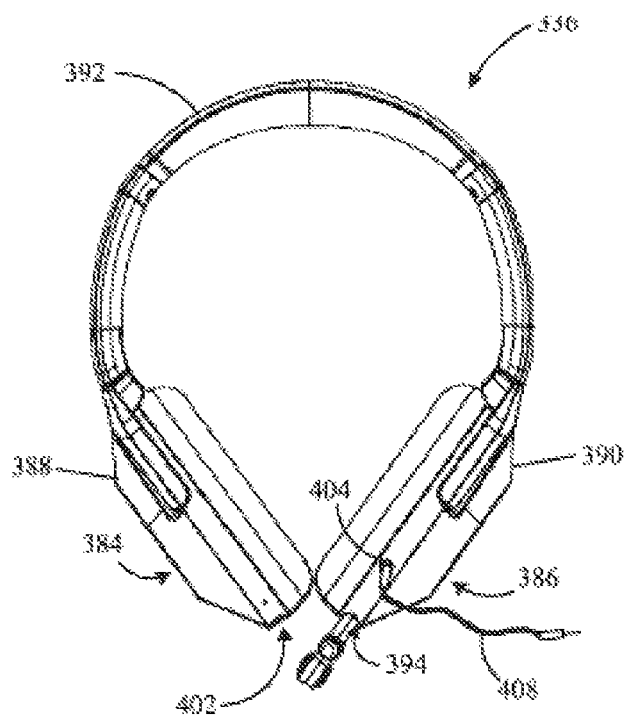
FIG. 17 shows a front view in elevation view of the gaming headset of FIG. 16, configured to interact with the third embodiment of the video gaming system of FIG. 9.

The (mobile) video gaming system 300, which preferably includes the bridgeless (electronic) video game controller 330 supported by the computing device 302 further includes and interacts with an audio headset 336 (of FIGS. 16 & 17). The bridgeless (electronic) video game controller 330 is in direct, wired electronic communication with the processor 306 by way of the combination audio and data input/output port 304 of said computing device 302, and a combination audio and data input/output port 305 of the bridgeless (electronic) video game controller 330.

Figure 11:
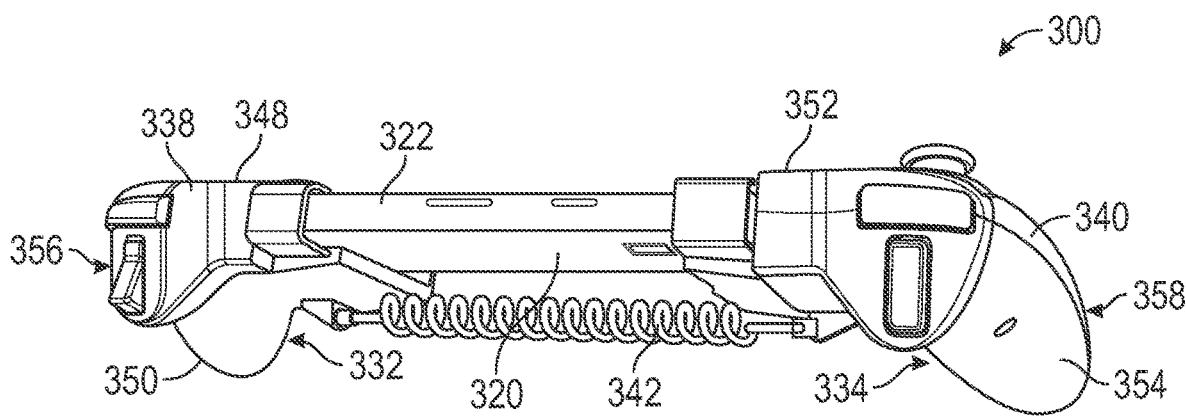
FIG. 11 shows a top perspective view of the third embodiment of the video gaming system of FIG. 9 depicting a power and data transfer cable communicating with each input module of the electronic video game controller of the third embodiment of the video gaming system of FIG. 9 constructed in accordance with various embodiments disclosed and claimed herein.

As shown by FIG. 11, the pair of video game control modules 332 & 334 of the bridgeless (electronic) video game controller 330 preferably includes at least a right-side input module portion 338, a left-side input module portion 340, and a tension free combination power and data communication cable 342 (also referred to herein as tension free cable 342). The tension free cable 342 is disposed between the right-side and left-side input module portions 338 & 340. The tension free cable 342 facilitates both data and power transfer between the right-side and left-side input module portions 338 & 340. The tension free cable 342 provides no structural support for neither said right-side nor said left-side input module portions 338 & 340.

As shown by FIG. 10, the video game controller 330, utilizes a pair of clamp assemblies, i.e., a right-side clamp assembly 344 and a left-side clamp assembly 346. The right-side clamp assembly 344 is secured to and independently interacts with the right-side input module portion 338 while the left-side clamp assembly 346 is secured to and independently interacts with the left-side input module portion 340. The right side and left side clamp assemblies 344 & 346, in unison, cooperatively attach and secure the bridgeless (electronic) video game controller 330 to the computing device 302, wherein the computing device 302 provides all structural support for each the right-side input module portion 338 and said left-side input module portion 340 by way of the corresponding right-side clamp assembly 344 and left-side clamp assembly 346.

As further shown by FIG. 11, each right-side input module portion 338 and left-side input module portion 340 include at least, but are not limited to, a top enclosure (348 & 352) and a corresponding bottom enclosure (350 & 354), each top enclosure and a corresponding bottom enclosure join to form corresponding input module housing (356 & 358). As further shown by FIG. 10, the (mobile) video gaming system 300, wherein the right-side and left-side input module portions 338 & 340 provide a plurality of input devices including, but not limited to, buttons 360, joysticks 362, and triggers 364.

Figure 12:
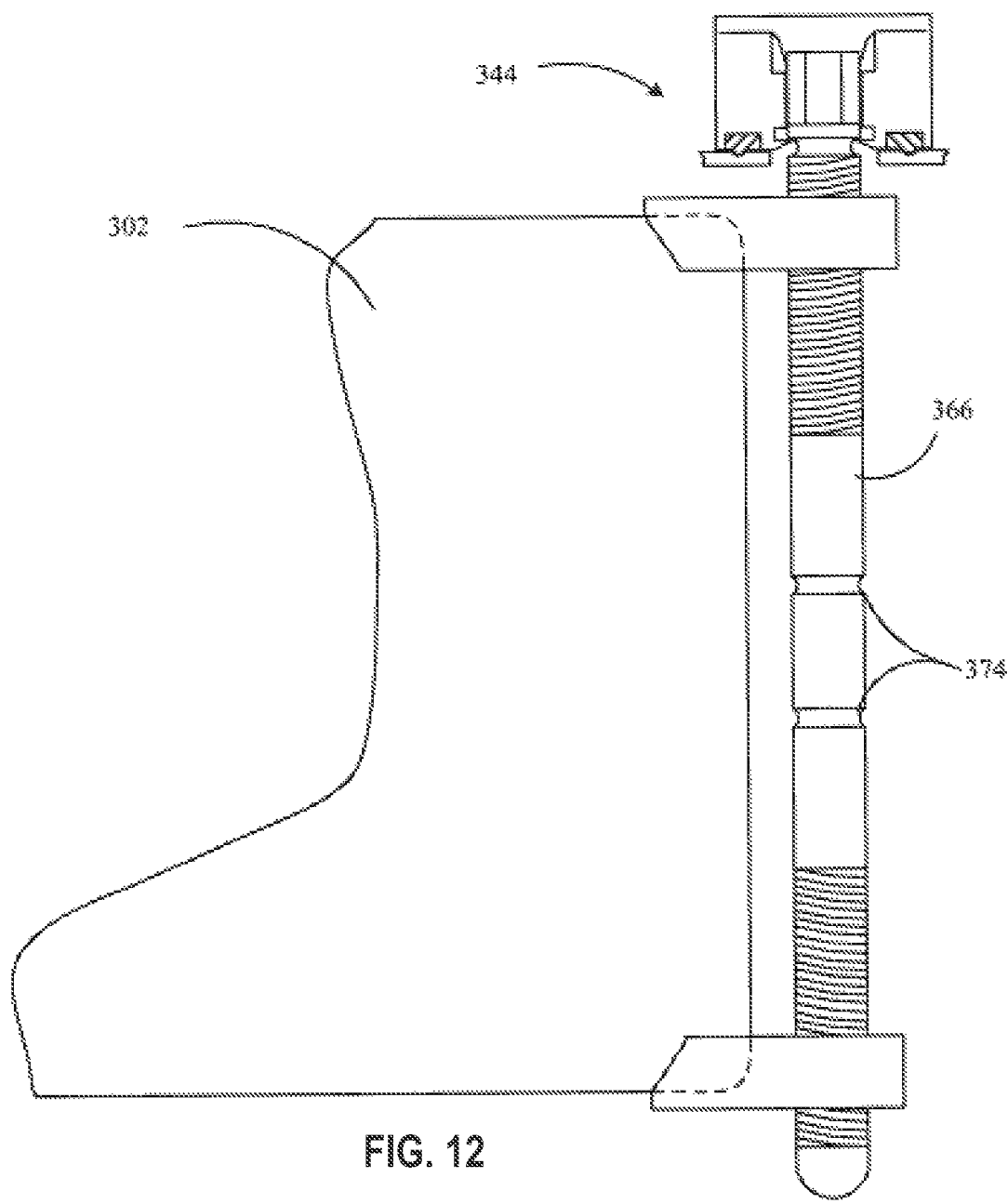
FIG. 12 displays a partial cutaway front view in elevation of the clamp assembly supported by the computing device of the third embodiment of the video gaming system of FIG. 9.
Figure 14:
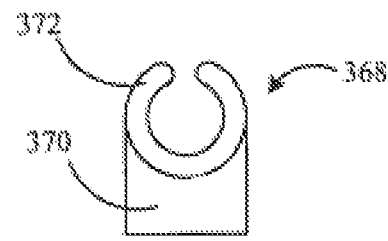
FIG. 14 shows a back plan view of a retention clip of the clamp assembly of the third embodiment of the video gaming system of FIG. 9.
Figure 15:
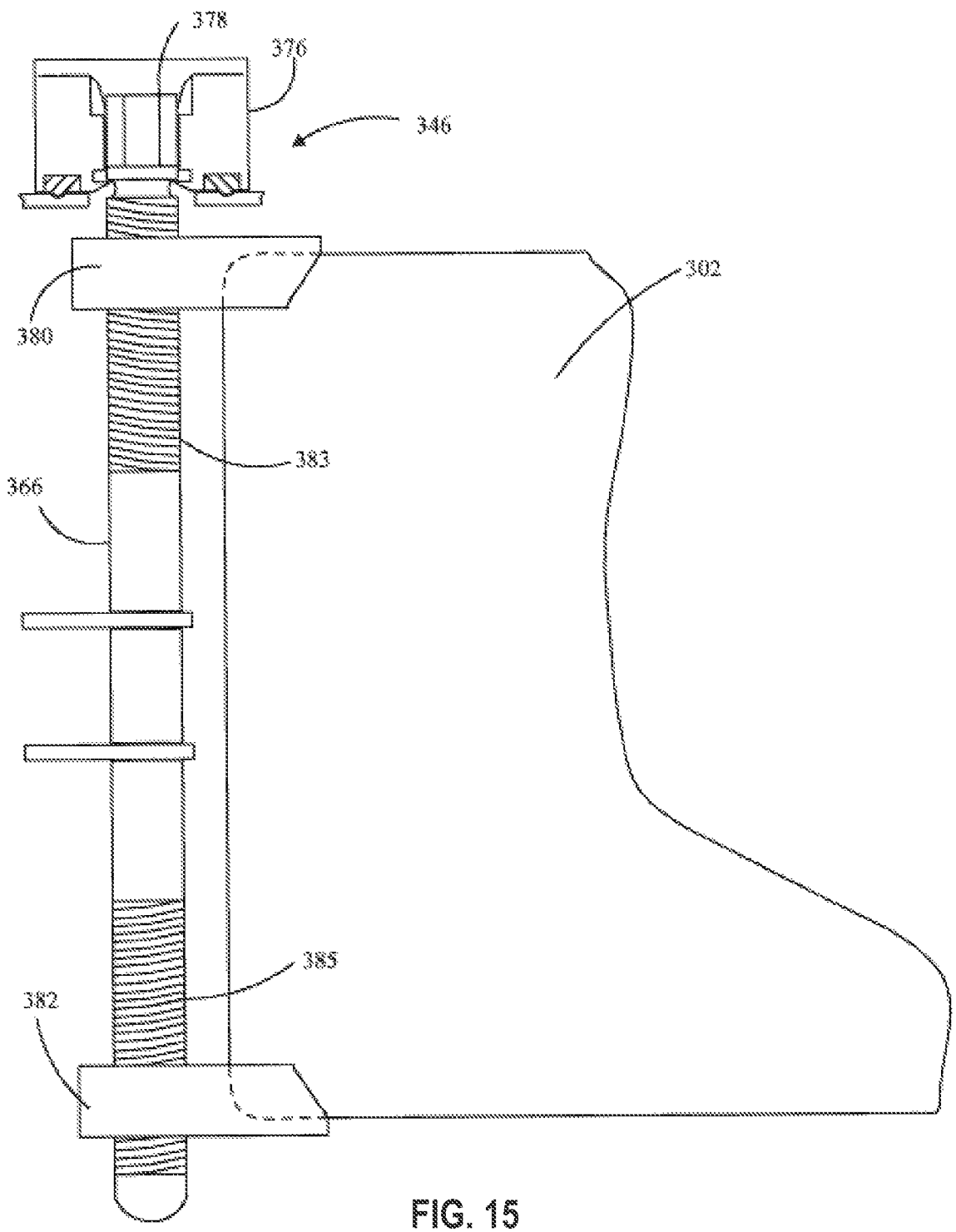
FIG. 15 illustrates a front view in elevation of the third embodiment of the video gaming system of FIG. 9, revealing a pair of retention clips engaged with the clamp shaft, said retention clips mitigates vertical displacement of the clamp shaft relative to the computing device while said retention clips facilitating rotation of the clamp shaft relative to the computing device.

FIG. 12 shows the right-side clamp assembly 344, while FIG. 15 shows the left-side clamp assembly 346, each of which are formed from a common set of components. The common set of components include, but are not limited to, a force translation shaft 366 secured to the right-side input module portion 338 (of FIG. 10), else the left side input module portion 340 Of FIG. 10), by a retention clip 368 as shown in FIG. 10. The retention clip 368 provides a mounting portion 370 and a securement portion 372 as shown by FIG. 14. The mounting portion 370 is secured to the input module housing (356 or 358), while securement portion 372 interacts with a retention grove 374, which is provided by the force translation shaft 366. The securement portion 372 precludes a vertical translation of the force translation shaft 366, relative to its corresponding input module portion (338 or 340), while promoting rotation of the force translation shaft 366 relative to its corresponding input module portion (338 or 340).

Figure 13:
FIG. 13 displays a top view of a head portion of a clamp shaft of the clamp assembly of the third embodiment of the video gaming system of FIG. 9.

FIG. 15 reveals an actuation knob 376 communicating with a multi sided head portion 378 of the force translation shaft 366, and a pair of jaws (380 & 382) communicating with the force translation shaft 366. The pair of jaws (380 & 382) are responsive to a rotational input force applied to the actuation knob 376. The pair of jaws (380 & 382) facilitate attachment of each the right-side input module portion 338, and the left-side input module portion 340 to the computing device 302. A top plan view of an embodiment of the multi sided head portion 378 is shown by FIG. 13.

FIG. 15 further reveals that the force translation shaft 366 presents a left-hand 383 thread on a proximal end and a corresponding right-hand thread 385 on an opposing distal end, such that when a clockwise rotation is applied to said force translation shaft 366, said pair of jaws (380 & 382) advance toward one another thereby closing said pair of jaws (380 & 382) onto said computing device 302, further when a counter-clockwise rotation is applied to said force translation shaft 366, said pair of jaws (380 & 382) retract from one another thereby opening said pair of jaws (380 & 382) from said computing device 302 permitting removal of said corresponding video game control modules (344 & 346 of FIG. 112) from said computing device 302.

FIGS. 16 & 17 show an audio headset 336 includes at least, but not limited to, a right-hand speaker 384 and a left-hand speaker 386, each right-hand and left-hand speakers (384 & 386) are housed within a corresponding right-hand and left-hand speaker housing (388 & 390). In a preferred embodiment, a head band 392 is disposed between and secured to each the right-hand and left-hand speaker housings (388 & 390).

FIG. 17 reveals a power and audio input communication port 394 provided by the right-hand speaker housing 388, else provided by the left-hand speaker housing 390. An audio input/output cable 396, shown in FIG. 16, the audio input/output cable 396 provides a first connector 398 and a second connector 400, the second connector 400 distil from the first connector 398, the first connector 398 interacts with an input/output communication port 402 of FIG. 17, else the second connector 400 interacts with the input/output communication port 402.

FIG. 17 further reveals a combination power and audio input port 404 provided by the right-hand speaker housing 388, else provided by the left-hand speaker housing 390; an energy storage device 406 housed by the right-hand speaker housing 388 else housed by the left-hand speaker housing 390, the energy storage device 406 interacts with the combination power and audio input port 404 and a charging cable 408 configured for connection to the combination power and audio input port 404 when the energy storage device 406 is charging.

Returning to FIG. 16, shown therein is a microphone 409 configured for connection to: the power and audio input communication port 394 (of FIG. 17); an audio processor 410; and a transceiver device 412. The audio processor 410 and the transceiver device 412 are configured to cooperate with the corresponding processor 306 (of FIG. 9) and the transceiver device 308 (of FIG. 9) of the computing device 302 (of FIG. 9).

Figure 18:
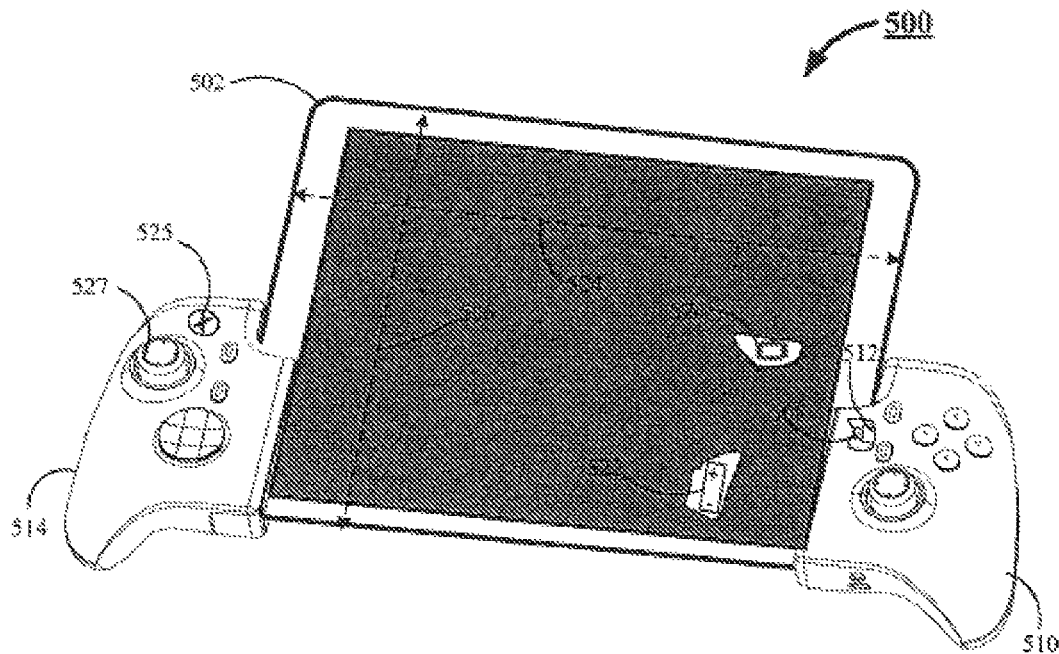
FIG. 18 shows a front view in elevation of a fourth embodiment of a video gaming system.

FIG. 18 shows a mobile video gaming system 500 that includes at least, but not limited to, a computing device 502. The computing device 502 presents a fixed length 504 greater than its width 506, said computing device 502 provides a first combination data/power connector 508. A first video game control module 510 provides a second combination data/power connector 512. The second combination data/power connector 512 is in electronic communication with the first combination data/power connector 508, thereby facilitating passage of data and power and audio signals between said first video game control module 510 and the computing device 502. The mobile video gaming system 500 preferably further includes a second video game control module 514 in electronic communication with the first video game control module 510, and a non-elastic, fixed length, flexible strap ("Strap") 516 (of FIG. 19) disposed between and secured directly to each the first video game control module 510 and the second video game control module 514. In a preferred embodiment, the Strap 516 includes two layers of webbing with a power and data conductor 517, sandwiched between the two layers of webbing.

Figure 19:
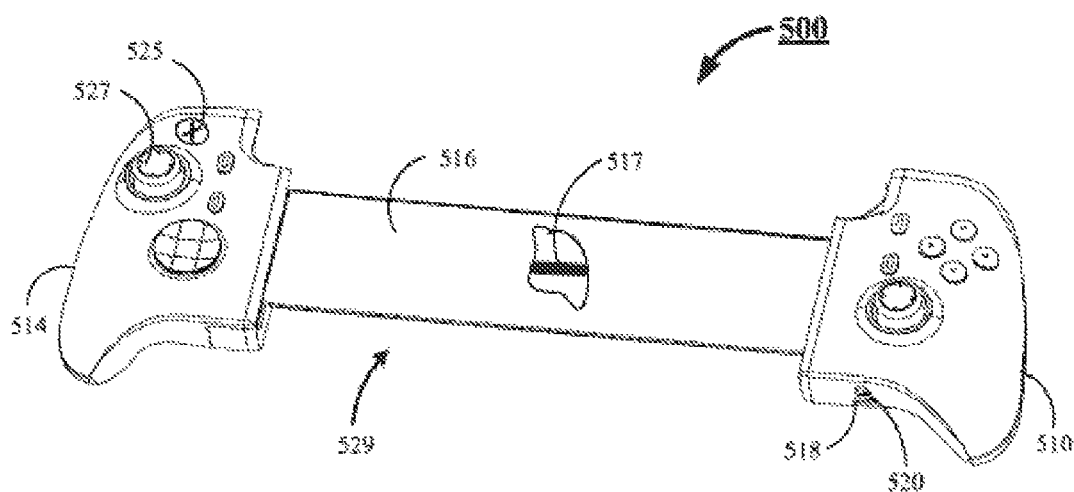
FIG. 19 shows a front perspective plan view of the fourth embodiment of a video gaming system of FIG. 18, revealing a non-rigid, non-stretchable webbing secured to each of the pair of input modules of the video game controller.

FIG. 19 further shows that upon securement of the strap 516 to each the first video game control module 510 and the second video game control module 514, neither the strap 516, nor the first video game control module 510, nor the second video game control module 514 facilitate any adjustment to accommodate a length of a computing device different than the fixed length 504 of the computing device 502.

Continuing with FIG. 19, in which the first video game control module 510 further provides a power input port 518 and an audio signal port 520. The power input port 518 facilitates transfer of power from an external charger to a battery 522 (of FIG. 18) of the computing device 502 (of FIG. 18), and the audio signal port 520 facilitates transfer of audio signals between an audio processor 524 (of FIG. 18) (such as Cmedia's CM6206 audio codec chip) of the computing device 502 and an external audio device (such as the audio headset 336 of FIG. 16).

Figure 20:
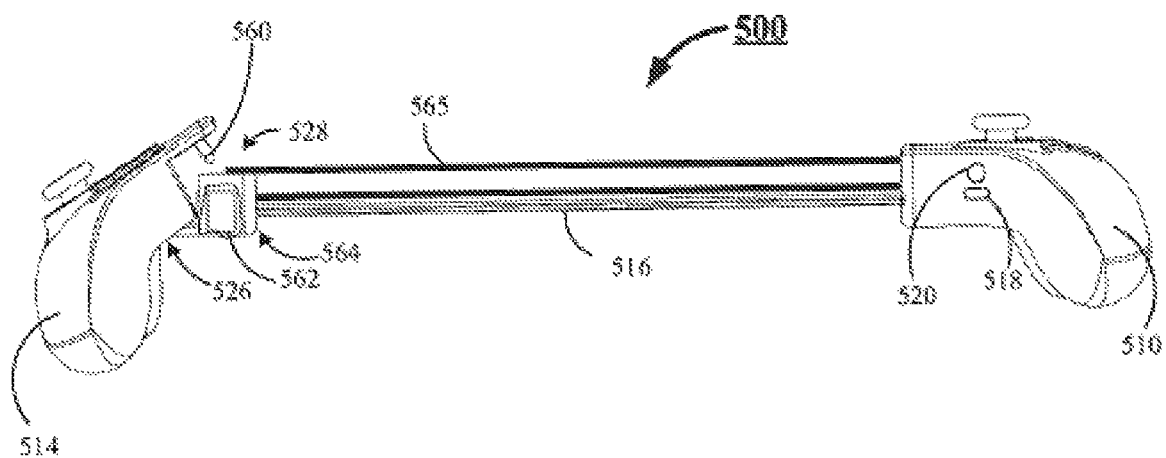
FIG. 20 shows a bottom view in elevation of the video gaming system of FIG. 19, which reveals a hinged hatch provided by at least one of the input modules.
Figure 21:
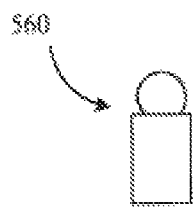
FIG. 21 shows front view in elevation of a ball portion of a ball and receiver latch, provided by at least one of the input modules of FIG. 20, said ball and receiver latch cooperate with the hinged hatch to confine the hinged hatch in a closed position.
Figure 22:
FIG. 22 shows a top plan view of the receiver portion of said ball and receiver latch of FIG. 20.

As shown by FIG. 20, the second video game control module 514 provides a hinged hatch 526 and a latch 528, the hinged hatch 526 interacts with the latch 528. The interaction of the hinged hatch 526 with the latch 528 confines and restrains the computing device 502 (of FIG. 18) within the first video game control module 510 and said second video game control module 514. In a preferred embodiment, the latch 528 includes at least, but is not limited to, two components: a ball 560, which is secured to the hinged hatch 526 and a receiver 562, which is secured to a strap restaurant member 564 of the second video game control module 514. FIG. 21 shows a front view in elevation of the ball 560, while FIG. 22 shows a top plan view of the receiver 562.

Figure 24:
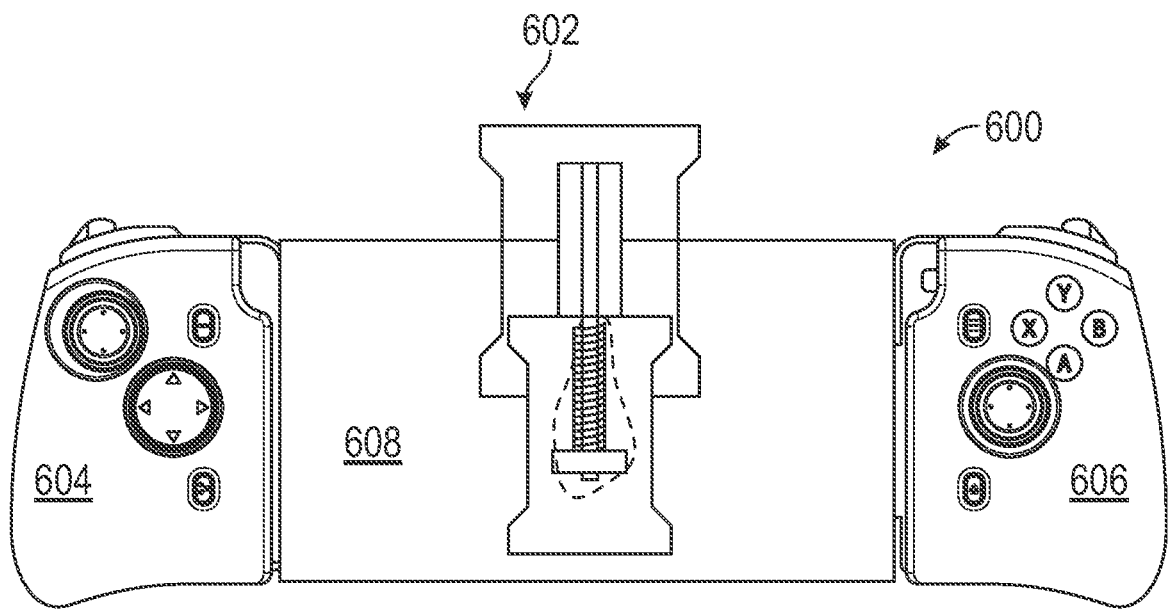
FIG. 24 shows a front plan view of a video game controller that supports a smart device holder, the smart device holder in an expanded position.

FIG. 23 shows a front plan view of an (alternate) video game controller 600, which supports a smart device holder 602. The smart device holder 602 is shown in its retracted position, while FIG. 24 shows the smart device holder 602 is shown in its expanded form. In a preferred embodiment of the video game controller 600, a pair of video game controller input modules 604 and 606 are joined one to the other by way of a rigid, non-expandable bridge section 608.

Figure 25:
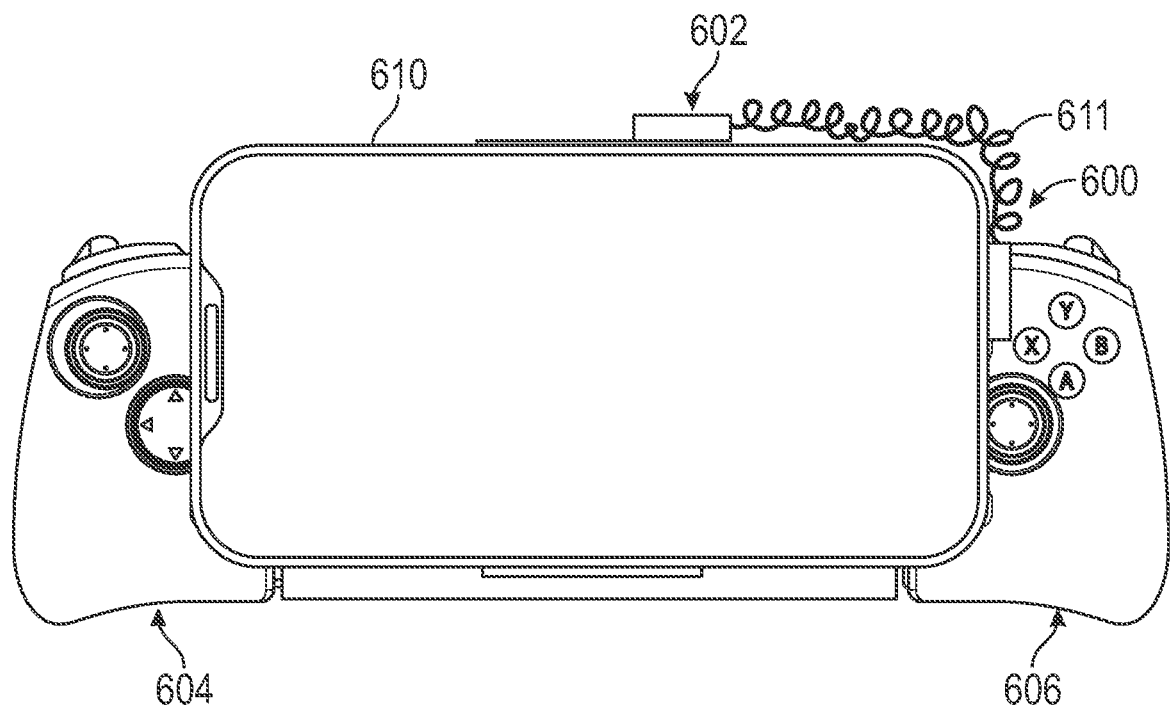
FIG. 25 shows a front plan view of a video game controller that supports a smart device holder, the smart device holder in an expanded position, the smart device holder secures a smart device in noncontact adjacency relative to a pair of input modules.

As shown by FIG. 25, the video game controller 600 supports the smart device holder 602, which in turn secures a smart device 610 in noncontact adjacency relative to a pair of video game controller input modules, 604 and 606. The term smart device refers to all classes of Wi-Fi enabled computers, Wi-Fi enabled cell phones, and Wi-Fi enabled television sets, wherein said Wi-Fi enabled computers, Wi- Fi enabled cell phones, and Wi-Fi enabled television sets each have imbedded operating systems.

Figure 26:
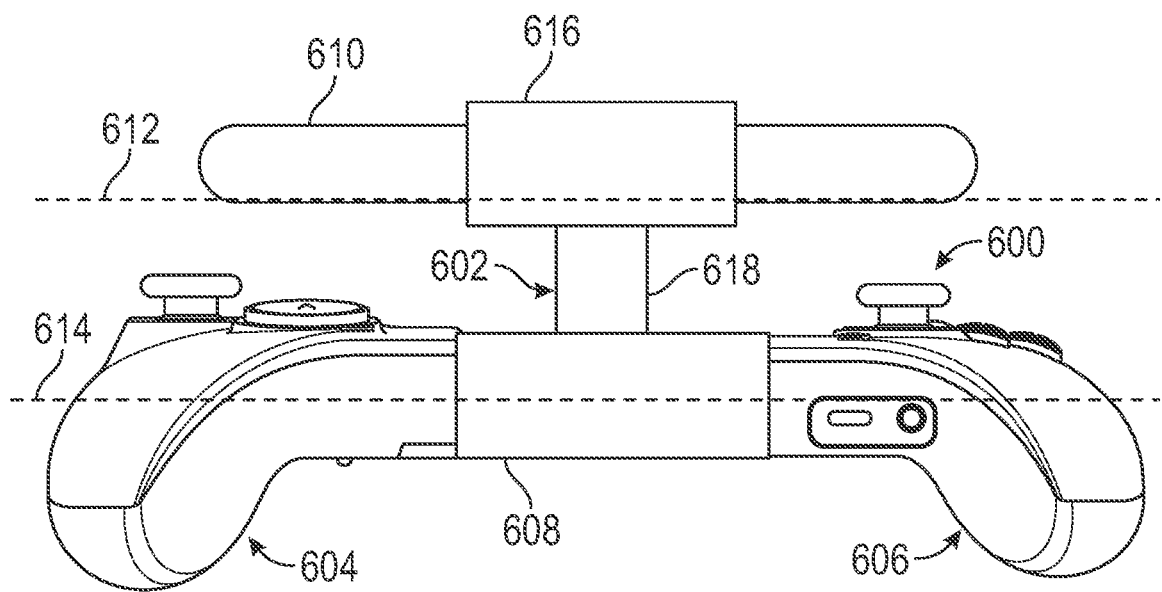
FIG. 26 shows a bottom view in elevation of a video game controller supporting a smart device holder, the smart device holder in an expanded position, the smart device holder confines the smart device in a plane parallel to a plane that bifurcates the pair of input modules.

FIG. 26 shows a bottom view in elevation of the video game controller 600 supporting the smart device holder 602. The smart device holder 602 secures and confines the smart device 610 in a fixed position, elevated above and lying in a plane 612 (as shown in dashed line form) parallel to a plane 614 (as shown in dashed line form). The plane 614 bifurcates the pair of video game controller input modules 604 and 606 and the rigid, non-expandable bridge section 608. The rigid, non-expandable bridge section joins together the pair of video game controller input modules 604 and 606. FIG. 26 further shows the smart device holder 602 includes a cradle portion 616 non-movably affixed perpendicular to a stand portion 618, wherein the stand portion is joined to the video game controller 600 such that the stand portion 618 is perpendicular to each of the planes 612 and 614, and the cradle portion 616 is affixed perpendicular to the stand portion 618.

Figure 27:
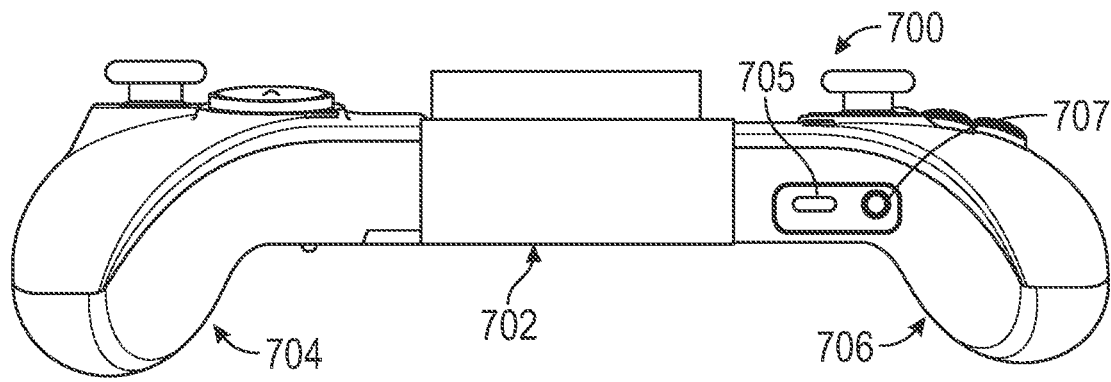
FIG. 27 shows a bottom view in elevation of a video game controller that provides a pair of input modules secured to a spring free rigid bridge section.

FIG. 27 shows a bottom view in elevation of an (alternative) video game controller 700 (also referred to herein as a video gaming system 700). The video game controller 700 includes an expandable, spring free, rigid bridge section 702, and a pair of video game input modules, 704 and 706 non-removably secured (i.e., non-removably coupled) to the expandable, spring free, rigid bridge section 702. Non-removably secured (or non-removably pinned, non-removably fastened, etc.) can include, for example, being unable to be removed without the use of tools, fixedly secured, integral, etc. Likewise, the term spring free describes attributes of, for example, the rigid bridge section 702 operating without the use of a spring to provide the expandability to the rigid spring section 702. FIG. 27 further shows that at least one of the video game input modules 704 and 706, provides a power passthrough port 705 and an audio jack input port 707. The power passthrough port 705 conducts current from an external source to a smart device, such as smart device 610 of FIG. 26, when the smart device 610 is electrically connected to the power passthrough port 705. The audio jack input port 707 conducts audio signals to an audio headset, such as audio headset 336 of FIG. 16, when the audio headset 336 is plugged into the audio jack input port 707.

Figure 28:
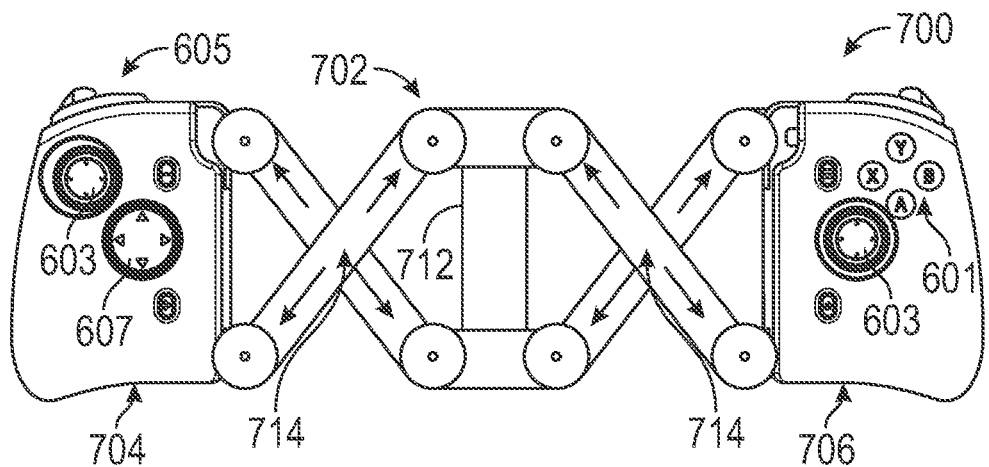
FIG. 28 shows a front plan view of the video game controller of FIG. 27, which reveals the spring free rigid bridge section is collapsible X frame spring free rigid bridge.
Figure 30:
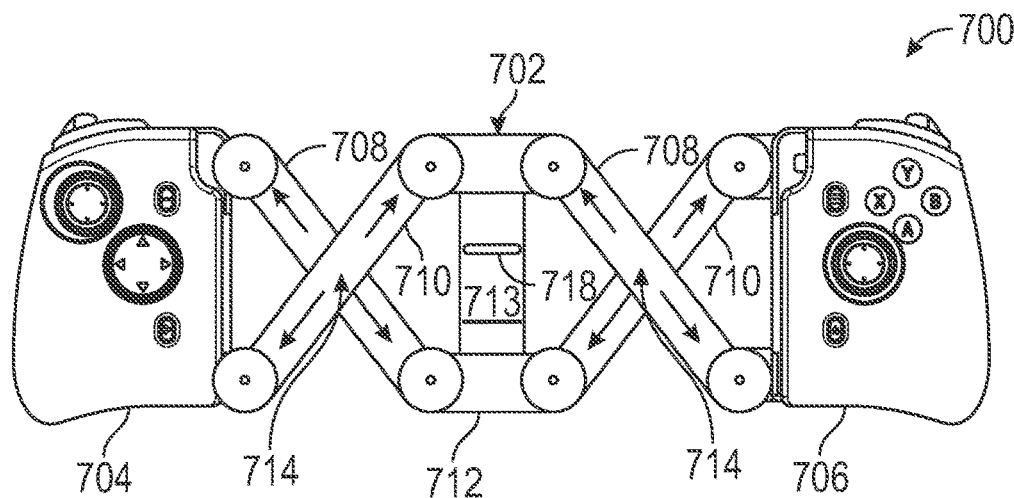
FIG. 30 shows a front plan view of the video game controller of FIG. 29, which reveals that each of the input modules is pinned to the collapsible X frame spring free rigid bridge.

FIG. 28 shows a front plan view of the video game controller 700 of FIG. 27, which reveals that the spring free rigid bridge section 702 is a collapsible, X frame, spring free, rigid bridge section 702 (also referred to herein as bridge section 702). Preferably, as shown by FIG. 30, the bridge section 702, is formed from a plurality of top struts 708 and bottom struts 710. The top struts 708 and the bottom struts 710 are pinned, by way of a respective connection pin 714 to: each of a king post 712 of the bridge section 702 on a proximal end; and to a respective one of the pair of video game controller input modules 604 and 606 on a distal end. FIG. 28 further shows that each of the video game controller input modules 704 and 706 (also referred to herein as input modules 704 and 706) provide a plurality of input devices including, but not limited to, buttons 601, joysticks 603, triggers 605, and a D pad 607.

Figure 29:
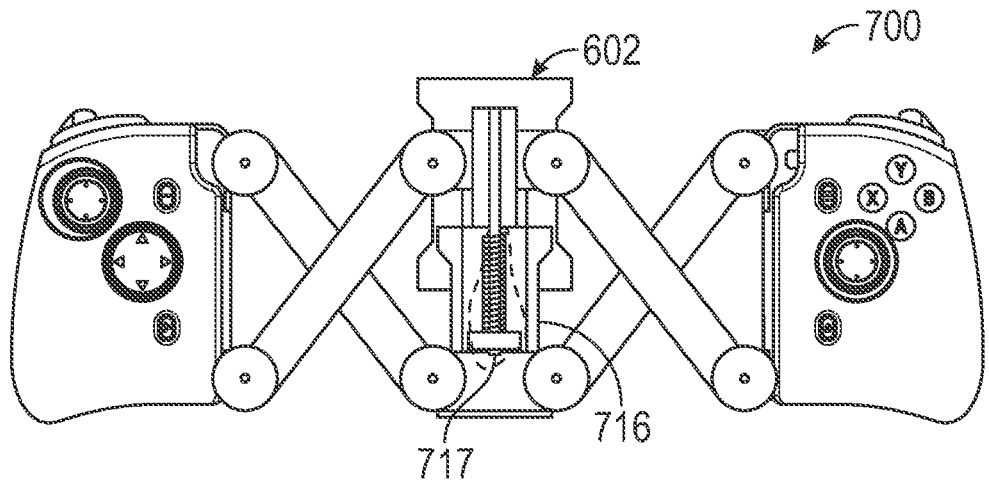
FIG. 29 shows a front plan view of the video game controller of FIG. 28, which reveals the smart device holder is tool free manually attached to the spring free rigid bridge is a collapsible X frame spring free rigid bridge.

FIG. 29 reveals the smart device holder 602 includes a spring member 716 enclosing a spring guide shaft 717. Spring member 716 is used to maintain the smart device holder 602 in its retracted form. The spring member 716 further allowing the smart device holder 602 to extend to its expanded form upon an application of a lateral force. The smart device holder 602, as shown by FIG. 29, is in its extended form. In a preferred embodiment of the (alternative) video game controller 700, the smart device holder 602, is manually attached to the king post 712 of FIG. 28, absent the need for or use of tools. The stand portion 618 (of FIG. 26) of the smart device holder 602 (of FIG. 26) inserts vertically into a securement aperture 718 (each of FIG. 30) of the king post 712. FIG. 30 more clearly shows the top struts 708 and bottom struts 710 are pinned, by way of a connection pin 714, to each a king post 712 on a proximal end, and to each of the pair of video game controller input modules 604 and 606 on a distal end. FIG. 30 further includes a front surface 713 surrounding the securement aperture 718.

Figure 31:
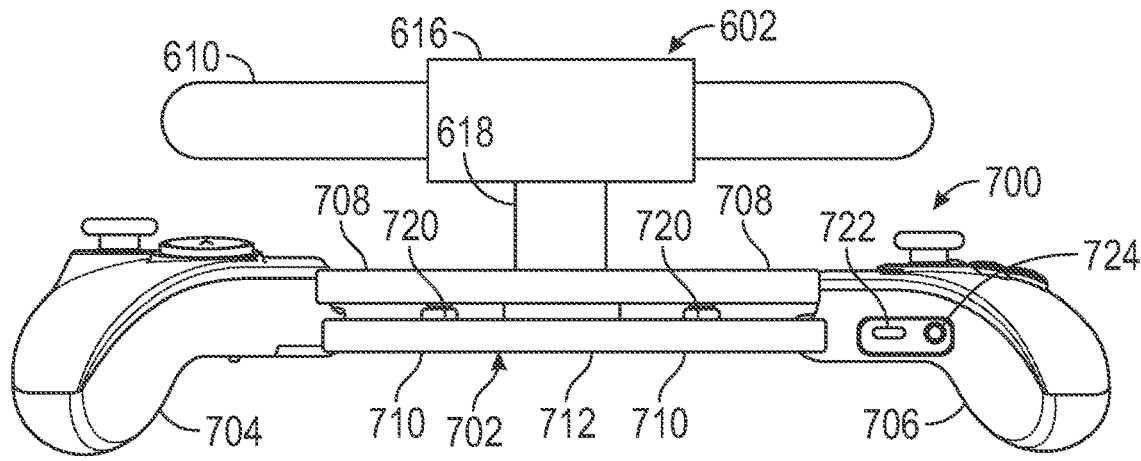
FIG. 31 shows a bottom view in elevation of the video game controller of FIG. 30, with a smart device holder attached thereon. The smart device holder is tool free manually attached to the video game controller, the collapsible, X frame, spring free rigid bridge is formed from a plurality of struts pinned to the input modules and linked one to the other by way of a mechanical joint.

FIG. 31 shows a bottom view in elevation of the video game controller 700 of FIG. 30 in which the smart device holder 602 is manually attached to the king post 712, the attachment made absence the use of tools. FIG. 31 further shows the collapsible, X frame, spring free, rigid bridge 702 is formed from the plurality of top struts 708 and bottom struts 710 pinned to the input modules 604 and 606 as well as to the king post 712. The top struts 708 and bottom struts 710 are linked one to the other by way of a mechanical joint 720. In a preferred embodiment the mechanical joint 720 is a referred to as a ball and socket joint 720.

Figure 32:
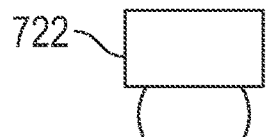
FIG. 32 shows a front view in elevation of a first member of the mechanical joint of FIG. 31 to be a ball portion of a ball and socket joint.

FIG. 32 shows a bottom view in elevation of a preferred embodiment in which a first member 722 of the ball and socket joint 720 of FIG. 31 is a ball portion of the ball and socket joint 720.

Figure 33:
FIG. 33 shows a front view in elevation of a second member of the mechanical joint of FIG. 31 to be a socket portion of a ball and socket joint.

FIG. 33 shows a bottom view in elevation of a preferred embodiment in which a second member 724 of the ball and socket joint 720 of FIG. 31 is a socket portion of the ball and socket joint 720.

Figure 34:
FIG. 34 shows a cross sectional view of the strut of FIG. 31.

FIG. 34 shows a cross sectional view of struts 708, 710 of FIG. 31.

Figure 35:
FIG. 35 shows a side view in elevation of the smart device of FIG. 25, in which the smart device may take the form of a smart phone, mini tablet, tablet, or other wireless communication enabled device that provides a viewing screen.

FIG. 35 a side view in elevation of a smart device 726, which may take the form of a smart phone, mini tablet, tablet, or other wireless communication enabled device which provides a viewing screen. For purposes of illustration, the smart device 726 is shown ad a mini tablet, which has at least a length greater than a length of the smart device 610 of FIG. 31.

Figure 36:
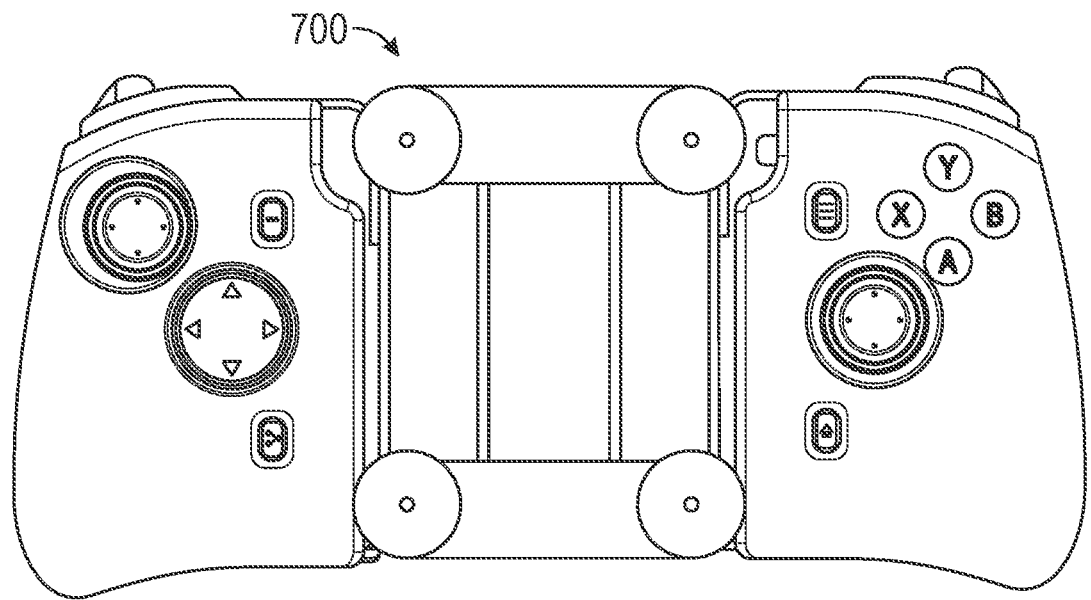
FIG. 36 shows a front plan view of the video game controller of FIG. 30 in its collapsed form.

FIG. 36 shows a front plan view of video game controller 700 of FIG. 30 in its collapsed form, with the pair of video game controller input modules 604 and 606 secured thereon.

Figure 37:
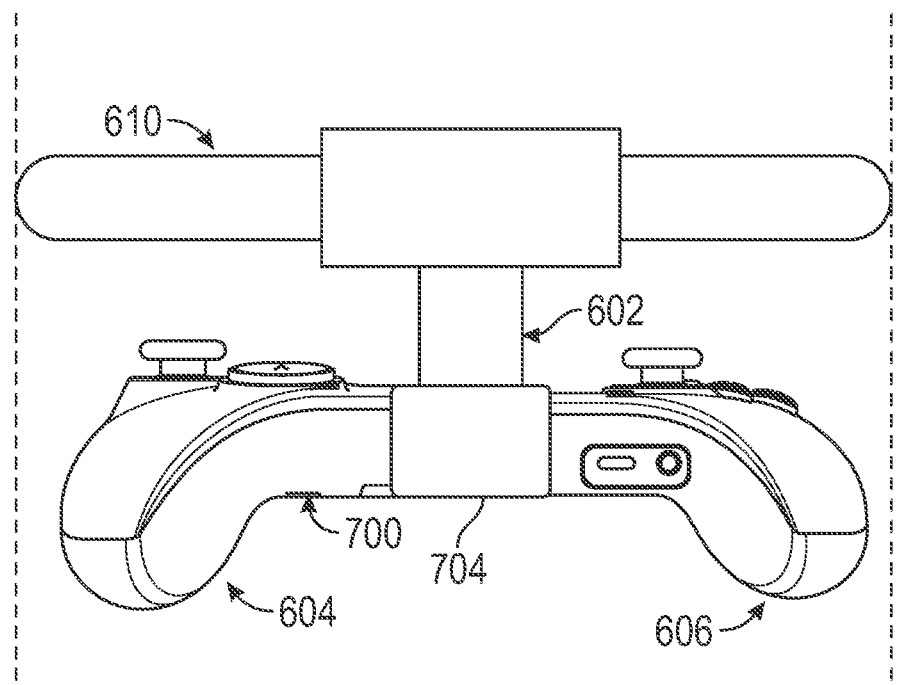
FIG. 37 shows a bottom view in elevation of the video game controller of FIG. 36 in its collapsed form with a smart device holder secured thereon. The smart device holder is manually attached to the video game controller absence the use of tools. The collapsible X frame, spring free, rigid bridge is formed from a plurality of struts pinned to the input modules and linked one to the other by way of a mechanical joint, the X frame spring free rigid bridge confines the smart device in a plane parallel to and vertically offset from a top face of the video game controller.

FIG. 37 shows a bottom view in elevation of the video game controller 700 in its collapsed form, the smart device holder 602 manually attached to the collapsible, X frame, spring free, rigid bridge 702, and the smart device 610 secured to the collapsible, X frame, spring free, rigid bridge 702 by way of the smart device holder 602. In this configuration, as shown by FIG. 37, the smart device 610 obscures the plurality of input devices of FIG. 28 including, but not limited to, buttons 601, joysticks 603, triggers 605, and a D pad 607 of the pair of video game controller input modules 604 and 606. The obscurement of the input devices is further shown by FIG. 63.

Figure 38:
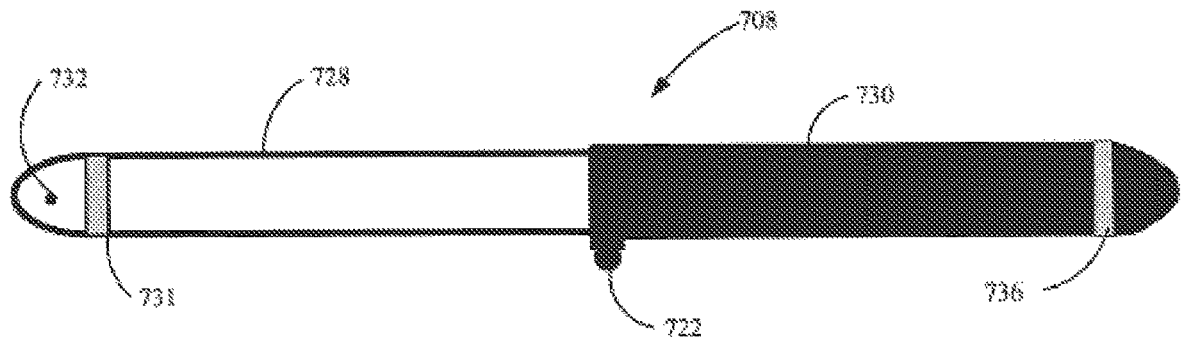
FIG. 38 shows a side view in elevation of a first type strut of the plurality of struts in its extended form. The first type strut provides a rod portion and a cylinder portion. The rod portion provides an attachment aperture and a breather orifice. The cylinder portion provides a seal portion (shown in partial cutaway by FIG. 39), a first member of the mechanical joint and a second attachment aperture. The rod portion is in sliding, frictional contact adjacency with the seal portion of the cylinder portion of the strut.

FIG. 38 shows a side view in elevation of the top strut 708 of the plurality of struts in its extended form. The top strut 708 provides a rod portion 728 and a cylinder portion 730. The rod portion 728 provides an attachment aperture 731 and a breather orifice 732. The cylinder portion 730 provides a seal portion 734 (shown in partial cutaway by FIG. 39), and the first member 722 of the mechanical joint 720 (of FIG. 31) and a second attachment aperture 736. In a preferred embodiment, the rod portion 728 is in slidable, frictional contact adjacency with the seal portion 734 of the cylinder portion 730 of the strut 708. The seal portion 734 is formed on an internal surfaces of the cylinder portion 730.

Figure 39:
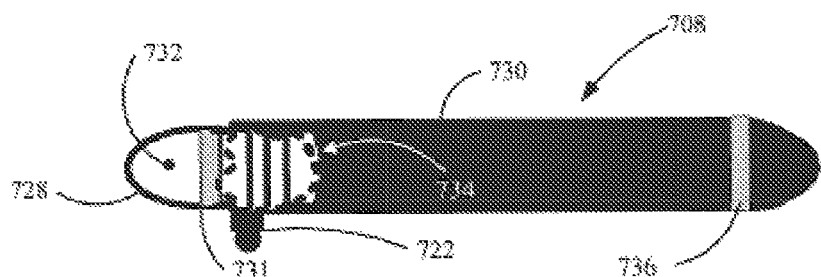
FIG. 39 shows a side view in elevation of the first type strut of FIG. 38 in its contracted form.

FIG. 39 shows the top strut 708 of FIG. 38 in its contracted form.

Figure 40:
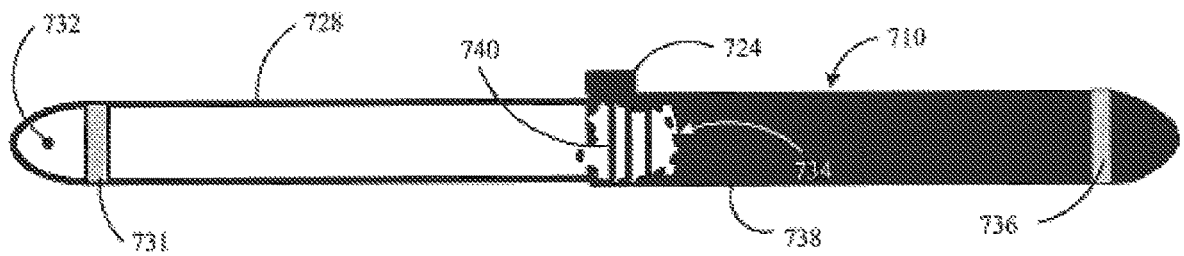
FIG. 40 shows a side view in elevation of a second type strut of the plurality of struts in its extended form. The second type strut provides a rod portion and a cylinder portion. The rod portion provides an attachment aperture and a breather orifice. The cylinder portion provides a seal portion, a second member of the mechanical joint and a second attachment aperture.

FIG. 40 shows the bottom strut 710 of the plurality of the plurality of bottom struts 710 in its extended form. The bottom strut 710 provides the rod portion 728 and a cylinder portion 738. The rod portion 728 provides the attachment aperture 731 and the breather orifice 732. The cylinder portion 738 provides a seal portion 734, the second member 724 of the mechanical joint 720 (of FIG. 31) and the second attachment aperture 736.

Figure 41:
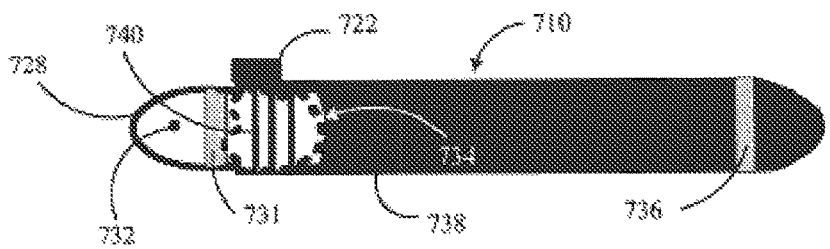
FIG. 41 shows a side view in elevation of the second type strut of FIG. 40 in its contracted form. In an embodiment of FIG. 40, the rod portion is positioned internal to the cylinder portion and slides within the cylinder portion in friction contact adjacency with the seal portion of the cylinder portion of the second strut.

FIG. 41 shows the bottom strut 710 strut of FIG. 40 in its contracted form. In an embodiment of FIG. 40 the rod portion 728 resides internal to the cylinder portion 738 and is in slidable, frictional contact adjacency with the seal portion 734 of the cylinder portion 738 of the bottom strut 710. In a preferred embodiment the seal portion 734 if formed from a plurality of O-rings 740.

Figure 42:
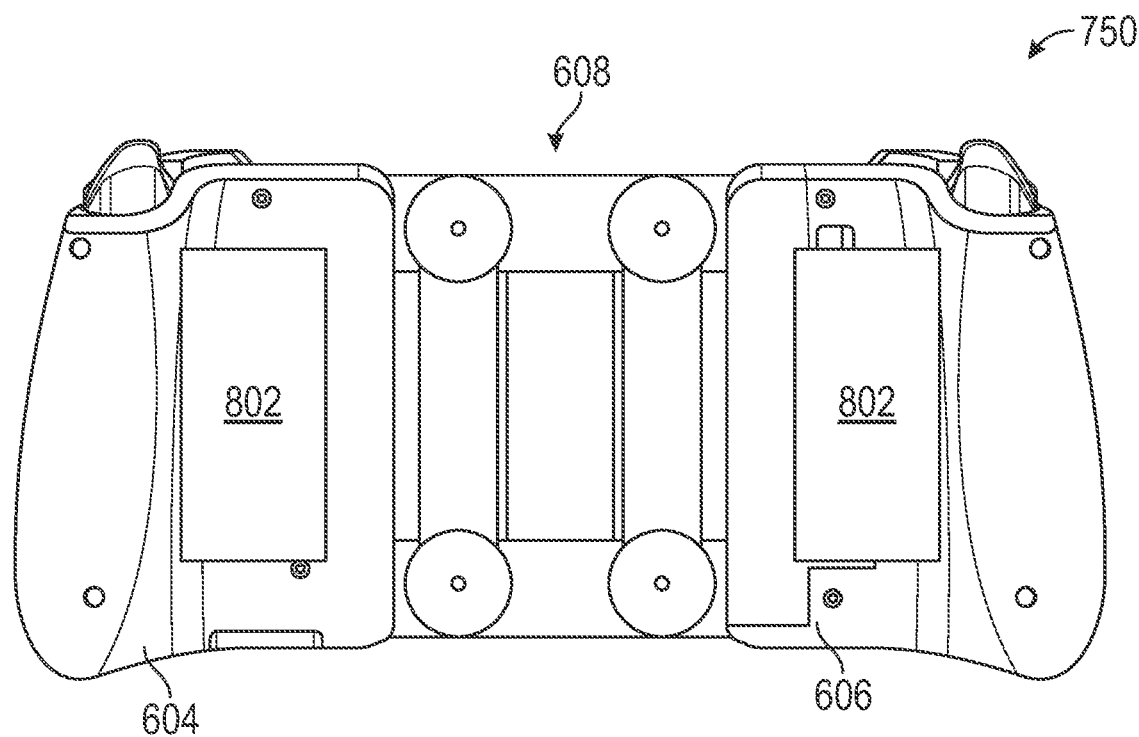
FIG. 42 shows a bottom plan view of the collapsible, X frame, spring free, rigid bridge, video game controller of FIG. 36 in the contracted form. The collapsible, X frame, spring free, rigid bridge, video game controller provides a touch sensitive screen on each of the pair of input modules.

FIG. 42 shows a bottom plan view of a video game controller 750. The video game controller 750 is structurally, mechanically comparable to the video game controller 600, with the addition of a pair of touch sensitive screens 802, secured to a back side of their respective input modules 604 and 606. As with video game controller 600, the input modules 604 and 606 are non-removably secured to the rigid, non-expandable bridge section 608, and the smart device holder 602 secures and maintains the smart device 610 in a fixed position, elevated above and lying in a plane, elevated above, offset from, and parallel to the top surface 621, of the rigid, non-expandable bridge section, 608. The pair of touch sensitive screens 802 are in electrical communication with and mechanically secured to their respective video game controller input modules 604 and 606. The output signal of each touch sensitive responds in a plurality of ways, depending on a direction of a swipe (up or down vertically, of back or forth horizontally). Additionally, tapping on a top portion, or a bottom portion of the screen generates on alternate single type than at obtained by a directionally centric swipe.

Figure 43:
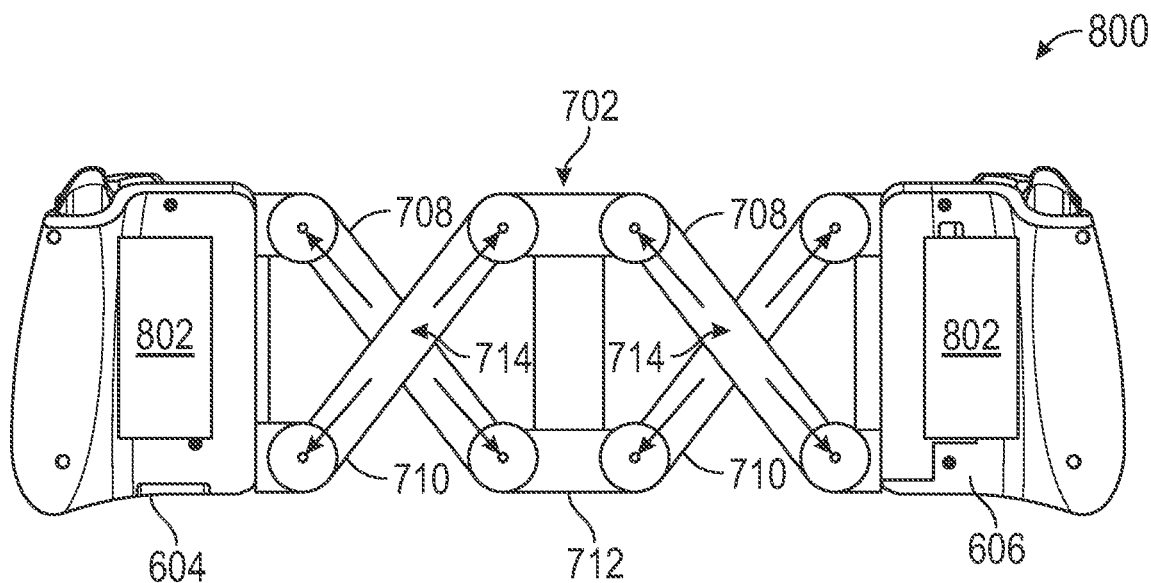
FIG. 43 shows a bottom plan view of the collapsible, X frame, spring free rigid bridge video game controller of FIG. 42 in its expanded form. The collapsible, X frame, spring free, rigid bridge, video game controller provides a touch sensitive screen on each of the pair of input modules.

FIG. 43 shows a bottom plan view of the collapsible, X frame, spring free, rigid bridge, video game controller 800 (also referred to herein as a video gaming system 800), in its expanded form and providing the pair of touch sensitive screens 802 on each of the pair of video game controller input modules 604 and 606. The pair of touch sensitive screens 802 are in electrical communication with and mechanically secured to their respective video game controller input modules 604 and 606.

Figure 44:
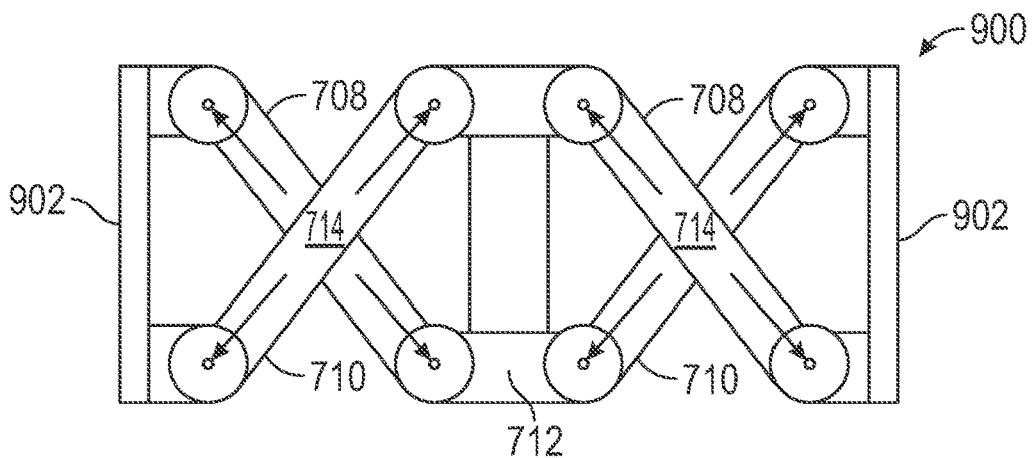
FIG. 44 shows a front plan view when a collapsible X frame spring free video game controller chassis in its expanded form.

FIG. 44 shows a front plan view if a collapsible, X frame, spring free, video game controller chassis 900 (also referred to herein as chassis 900). Chassis 900 is depicted in its expanded form and includes the plurality of top struts 708 and bottom struts 710 pinned, by way of a connection pin 714, to each the king post 712 on a proximal end and to each of a pair of module support struts 902 on the distal end.

Figure 45:
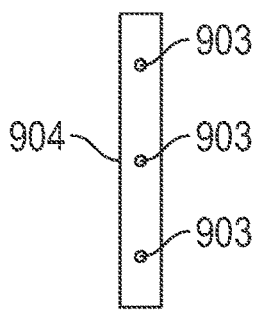
FIG. 45 shows a front view in elevation of an input module attachment rail of FIG. 44.

FIG. 45 shows a front view in elevation of an input module attachment rail 904, which presents at least one mounting aperture 903 (three shown). The mounting aperture(s) 903 promotes attachment of the input module attachment rail 904 to the module support strut 902.

Figure 46:
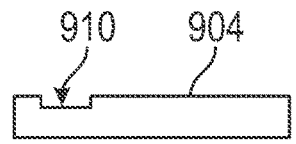
FIG. 46 shoes a side view in elevation of the input module attachment rail of FIG. 45. The input module rail member provides a video game controller input module retention notch.

FIG. 46 shows a side view in elevation of the input module attachment rail 904 of FIG. 45. The input module attachment rail 904 provides a video game controller input module retention notch 910.

Figure 47:
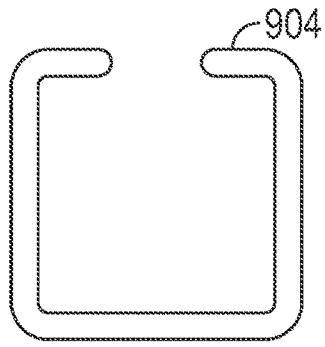
FIG. 47 shows a cross-section view of the input module attachment rail of FIG. 45.

FIG. 47 shows a cross-section view in elevation of the input module attachment rail 904 of FIG. 45.

Figure 48:
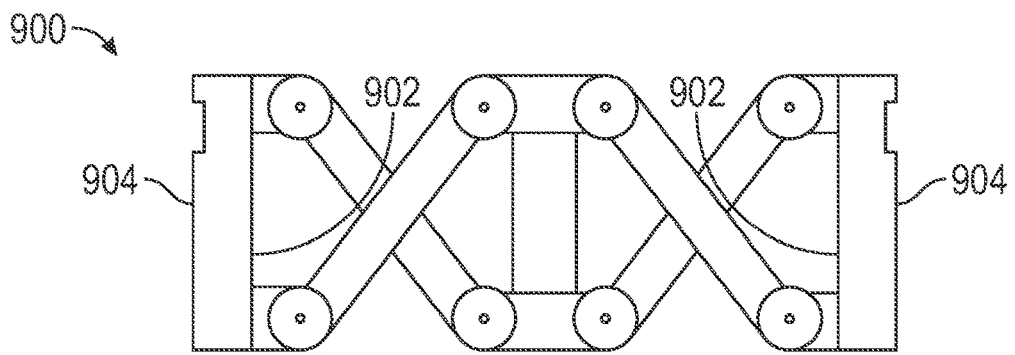
FIG. 48 shows a front plan view when the collapsible X frame spring free video game controller chassis in its expanded form of FIG. 44 with a pair of input module attachment rails of FIG. 46 secured to each side of the collapsible, X frame, spring frame video game controller chassis.

FIG. 48 shows a front plan view if the chassis 900 in its expanded form with a pair of input module attachment rails 904 of FIG. 46 secured to the module support struts 902.

Figure 49:
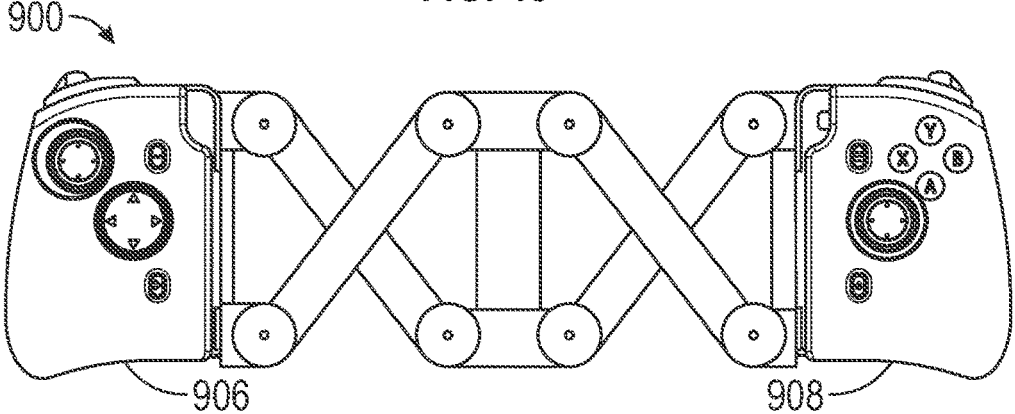
FIG. 49 shows a front plan view when the collapsible, X frame, spring free, video game controller chassis in its expanded form of FIG. 48 and a pair of attachable and detachable video game input modules attached to the pair of attachment rails.

FIG. 49 shows a front plan view if the chassis 900 of FIG. 48 in its expanded form with a pair of manually attachable and detachable video game input modules 906 and 908, slidingly attached to each of their corresponding input module attachment rails 904 of FIG. 46. In a preferred embodiment the pair of manually attachable and detachable video game input modules 906 and 908 are wireless manually attachable and detachable video game input modules 906 and 908

Figure 50:
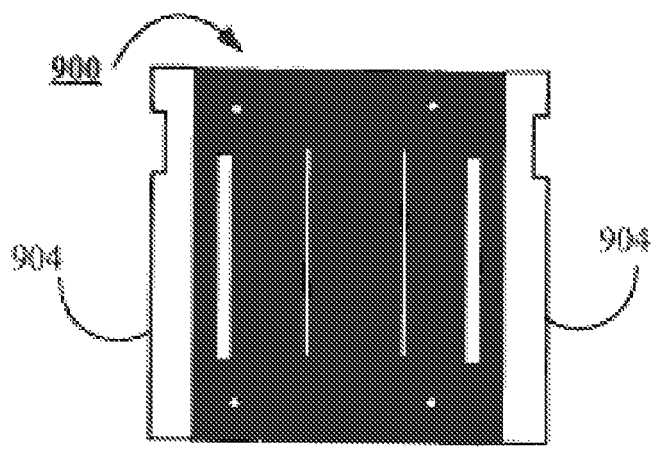
FIG. 50 shows a front plan view when the collapsible, X frame, spring free, video game controller chassis (also referred to herein as a controller chassis) with the input module attachment rails of FIG. 48 secured thereon. The controller chassis with the attached attachment rails secured thereon is presented in its contracted form.

FIG. 50 shows a front plan view of the chassis 900 with attached input module attachment rails 904 of FIG. 48. The chassis 900 is shown in its contracted form.

Figure 51:
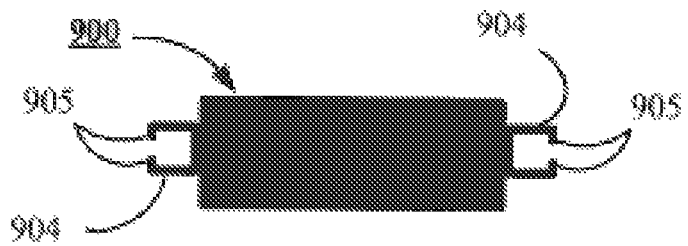
FIG. 51 shows a top plan view of the controller chassis including the module attachment rails secured thereon.
Figure 60:
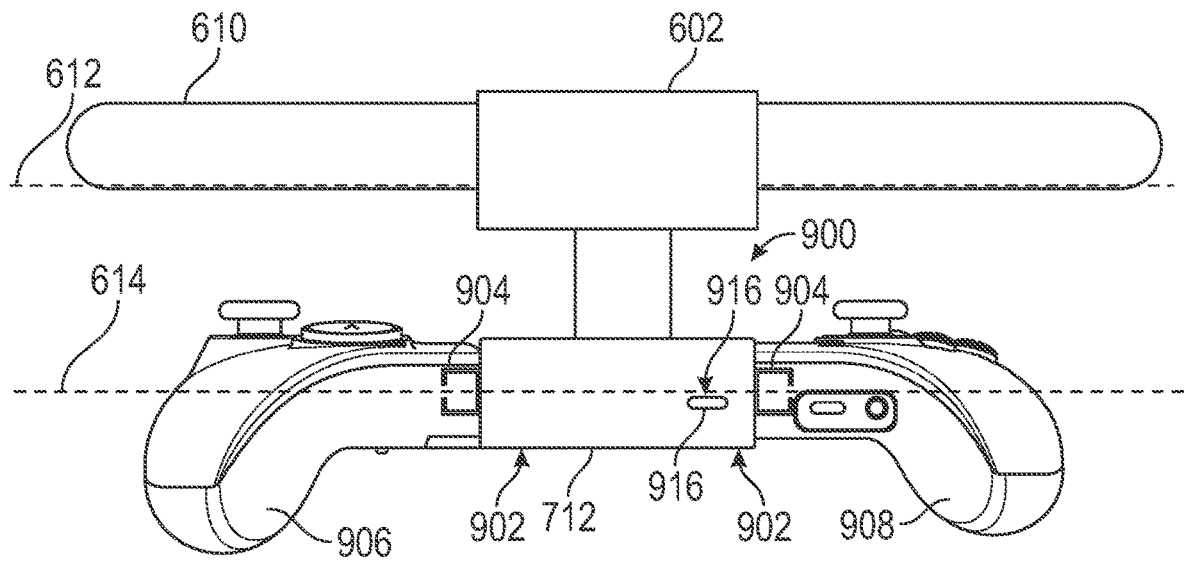
FIG. 60 shows a bottom view in elevation of each the left-side and the right-side video game input module slidingly secured to the controller chassis, the smart device holder manually removably secured to the controller chassis. The smart device holder securing and maintaining the smart device in a plane offset from and parallel to the top surface of controller chassis.

FIG. 51 shows a top plan view of the chassis 900 with input module attachment rails 904 secured thereon. FIG. 50 further shows that each input module attachment rail 904 provides a pair of module restraints 905. The module restraints 905 secure the pair of manually attachable and detachable video game input modules 906 and 908 adjacent the pair of module support struts 902 of the chassis 900 as shown by FIG. 60.

Figure 52:
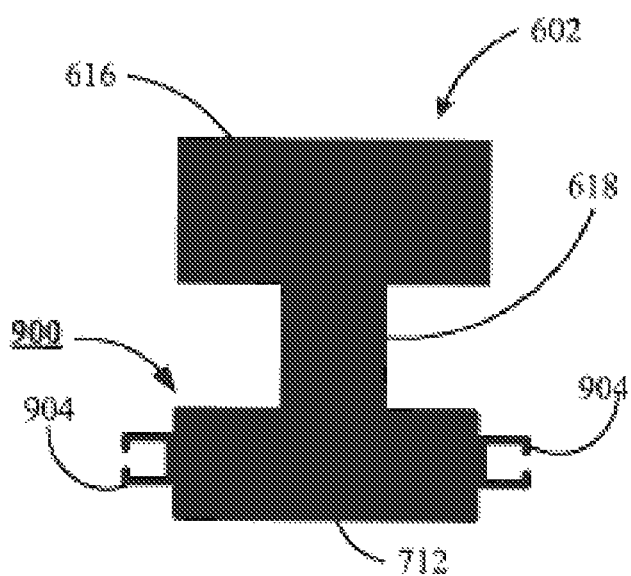
FIG. 52 shows a bottom plan view when the controller chassis in its collapsed form with the input module attachment rails (also referred to herein as attachment rails) secured thereon, and the smart device holder seated in the controller chassis. The smart device holder is manually seated within the controller chassis without the use of tools.

FIG. 52 shows a bottom plan view of the chassis 900 in its collapsed form with the input module attachment rails 904 attached thereon. FIG. 52 further depicts the smart device holder 602 that includes the cradle portion 616. The smart device holder 602 is non-removably secured to a stand portion 618. The stand portion 618 is joined to the king post 712 of the chassis 900 such that the stand portion 618 is perpendicular to each of the king post 712 and the cradle portion. The smart device holder 602 is manually attached to the king post 712 portion of the chassis 900 absence the use of tools.

Figure 53:
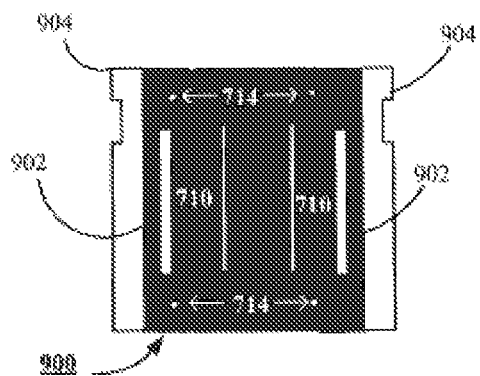
FIG. 53 shows a back view in elevation of the controller chassis including the bottom struts secured thereon, and the attachment rails secured thereto.

FIG. 53 shows a back view in elevation of the chassis 900 with input module attachment rails 904 secured thereon. FIG. 53 further shows that each bottom strut 710 is secured to its respective module support struts 902 of the chassis 900 by way of way of corresponding connection pins 714.

Figures 54, 55:
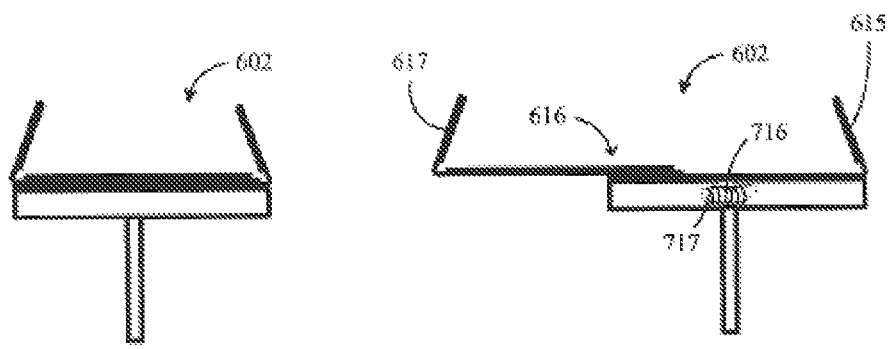
FIG. 54 shows a left side view in elevation of the smart device holder of FIG. 53 in its retracted form.
FIG. 55 shows the left side view in elevation of the smart device holder of FIG. 54 in its expanded form. In a preferred embodiment a spring member is used to maintain the smart device holder in its retracted form. The spring member further allowing the smart device holder to extend to its expanded form, and with a smart device confined by the smart device holder, the smart device holder provides a compressive load on the smart device.

FIG. 54 shows a left side view in elevation of the smart device holder 602 of FIG. 52 in its retracted form.

FIG. 55 shows the left side view in elevation of the smart device holder 602 of FIG. 54 in its expanded form. In a preferred embodiment the spring member 716 enclosing the spring guide shaft 717 and applies a tension force between a fixed smart device stop 615 and a movable smart device stop 617. The spring member 716 maintains the smart device holder 602 in its retracted form. The spring member 716 further allowing the smart device holder 602 to extend to its expanded form and hold a smart device such as the smart device 726 of FIG. 35 under a compressive load.

Figure 56:
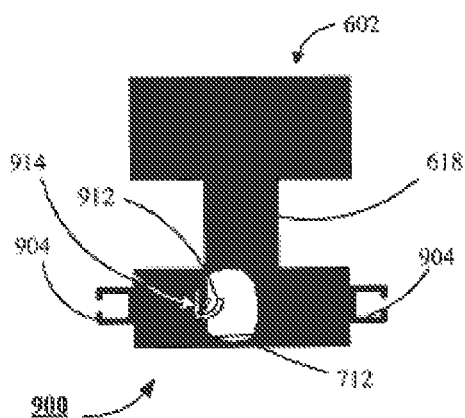
FIG. 56 shows a bottom plan view if the controller chassis in its collapsed form with the input module attachment rails, of FIG. 51, attached thereon, and the smart device holder mounted on the chassis. The smart device holder is manually attached to the chassis.

FIG. 56 shows a bottom plan view of chassis 900 in its collapsed form with the input module attachment rails 904 of FIG. 50, attached thereon. FIG. 56 further shows the stand portion 618 of the smart device holder 602 attached to the king post 712. The smart device holder 602 is tool free manually attached to the king post 712 of the chassis 900. A partial cutaway of the king post 712 shows the stand portion 618 of the smart device holder 602 provides a retention barb 912, and the king post 712 of the chassis 900 provides a retention aperture 914. An interaction of the retention barb 912 protruding through the retention aperture 914 to maintain the smart device holder 602 removably secured to the chassis 900.

Figure 57:
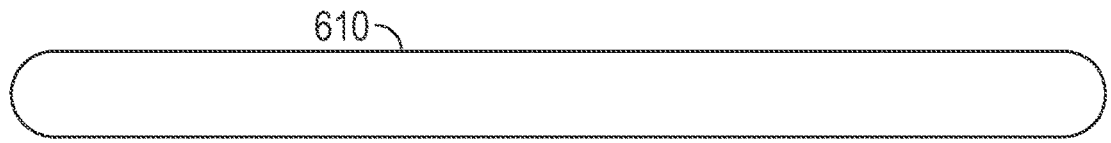
FIG. 57 shows a side view in elevation of the smart device.

FIG. 57 shows a side view in elevation of the smart device 610.

Figure 58:
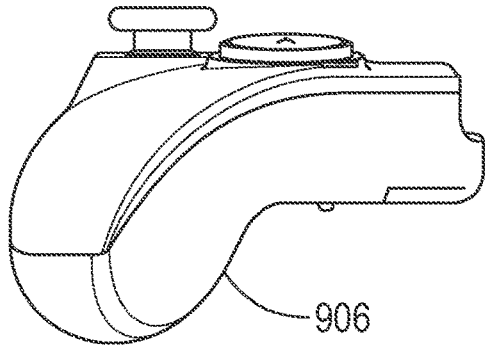
FIG. 58 shows a bottom view in elevation of a left-side video game input module.

FIG. 58 shows a bottom view in elevation of a left-side video game input module 906.

Figure 59:
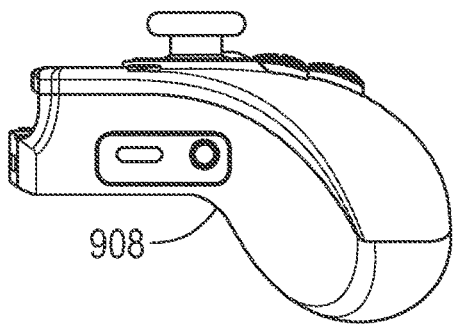
FIG. 59 shows a bottom view in elevation of a right-side video game input module.

FIG. 59 shows a bottom view in elevation of a right-side video game input module 908.

FIG. 60 shows a bottom view in elevation of each the left-side and right-side video game input modules 906 and 908 are slidingly secured to the input module attachment rails 904 of the chassis 900. The smart device holder 602, is manually removably secured to the controller chassis 900. The smart device holder 602 secures and maintains the smart device 610 in a fixed position, elevated above and lying in a plane 612 (as shown in dashed line form) parallel to a plane 614 (as shown in dashed line form). The plane 614 bifurcates the pair of video game (controller) input modules 906 and 908, and the king post 712. FIG. 60 further shows a wireless charger connection port 916. The wireless charger connection port 916 conducts current from an external source to a wireless charger 918 shown by FIGS. 61 and 62.

Figure 61:
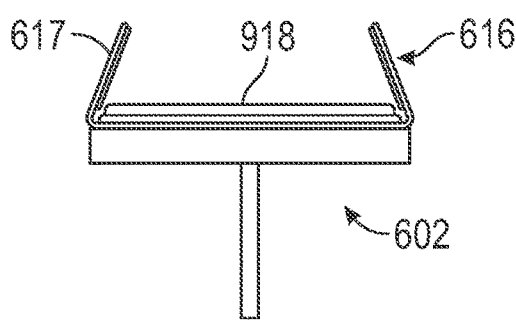
FIG. 61 shows a side view in elevation of the smart device holder with a wireless charger, such as the "MagSafe" wireless charger by Apple Inc.

FIG. 61 shows a side view in elevation of the smart device holder 602 with a wireless charger 918 secured thereon. In a preferred embodiment, the wireless charger 918, such as the "MagSafe" wireless charger by Apple Inc., is secured to the movable smart device stop 617.

Figure 62:
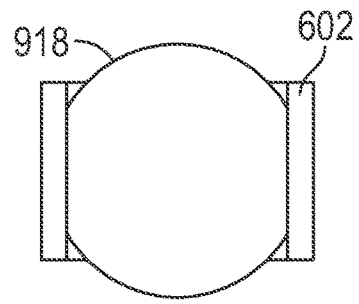
FIG. 62 shows a top view of the smart device holder with a wireless charger secured thereon.

FIG. 62 shows a top view of the smart device holder 6t02 with a wireless charger 918 secured thereon.

Figure 63:
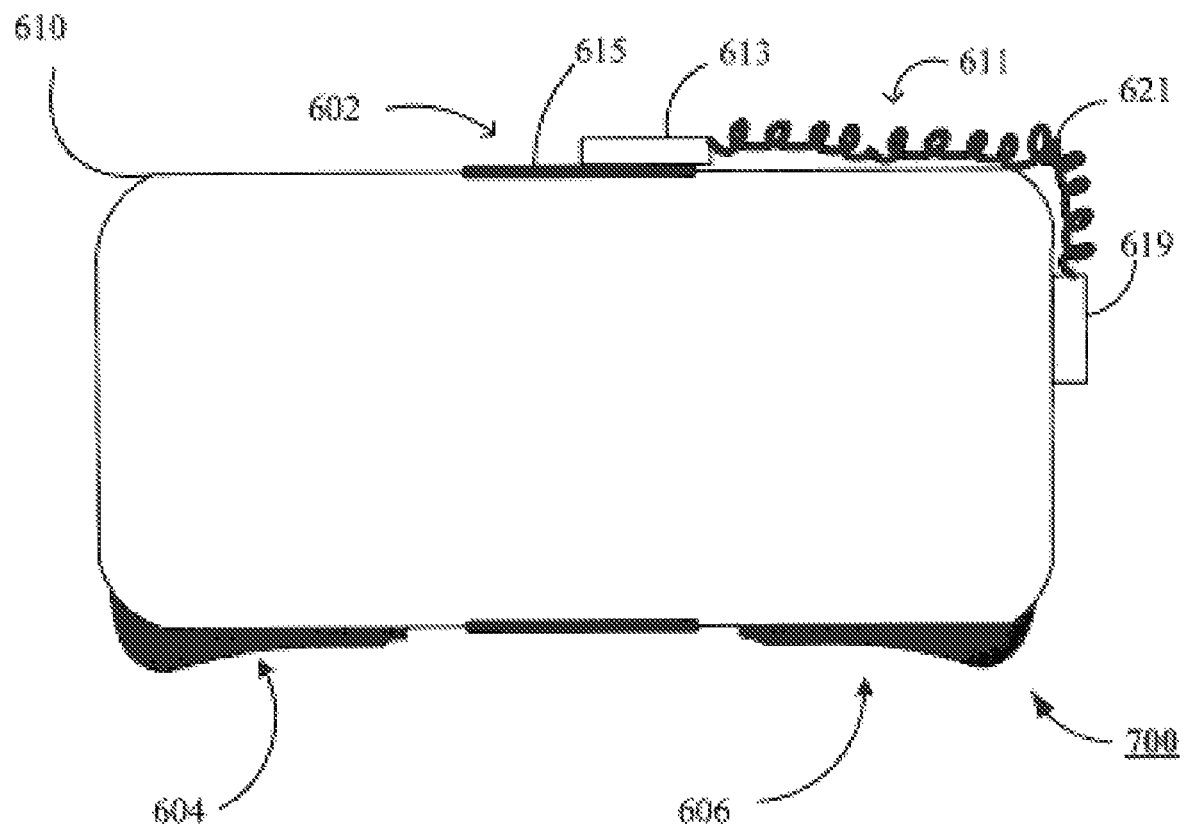
FIG. 63 shows a front plan view with the alternative video game controller in its collapsed position, the smart device secured to the alternative video game controller by smart device holder. The smart device obscures the plurality of input devices including, but not limited to, buttons joysticks, triggers 605, and a D pad of the pair of video game controller input modules.

FIG. 63 shows a front plan view with the (alternative) video game controller 700 in its collapsed position, the smart device 610 secured to the video game controller 700 by smart device holder 602. In a preferred embodiment, the smart device 610 obscures the plurality of input devices including, but not limited to, buttons 601, joysticks 603, triggers 605, and a D pad 607 of the pair of video game controller input modules 604 and 606 each of FIG. 28. FIG. 63 further shows that a signal cable 611 transmits input signals from the video game controller 700 to the smart device 610. The signal cable 611 includes a first connector 613 secured to the fixed smart device stop 615 of the smart device holder 602, and a second connector 619 plugged into the smart device 610.

A video game controller, such as video game controller 600, which includes a pair of video game control modules, such as 604 and 606, non-removably secured to a rigid, non-expandable bridge section, such as 608, is provided. Then a stand portion, such as 618, of a smart device holder, such as 602, is manually pushed through a securement aperture, such as 609, of a rigid, non-expandable bridge section, such as 608. A retention barb, such as 912, of a stand portion, such as 618, of a smart device holder, such as 602, precludes an inadvertent removal of a smart device holder, such as 602, from a rigid, non-expandable bridge section, such as 608. When seating of a smart device stand, such as 602, into a rigid, non-expandable bridge section, such as 608 is complete, a smart device, such as 610, is affixed to a cradle portion, such as 616, of a smart device holder such as 602, and connected electrically to a video game controller, such as video game controller 600, by way of a signal cable, such as 611. When a smart device, such as 610, is affixed to a smart device holder, such as 602, a smart device, such as 610, lies in a plane, such as 612, elevated above, offset from, and parallel to a top surface, such as 621, of a rigid, non-expandable bridge section, such as 608.

A video game controller, such as video game controller 700, which includes a pair of video game control modules, such as 704 and 706, pined to an expandable, spring free, rigid bridge section, such as 702, by a plurality of securement pins, such as 714, is provided. In a preferred embodiment a stand portion, such as 618, of the smart device holder, such as 612, is vertically inserted through a securement aperture, such as 718, of a king post, such as king post 712, of an expandable, spring free, rigid bridge section, such as 702 and secured within a king post, such as king post 712. Then, a smart device, such as 610, is affixed to a cradle portion, such as 616, of a smart device holder such as 602, and connected electrically to a video game controller, such as video game controller 600, by way of a signal cable, such as 611. When a smart device, such as 610, is affixed to a smart device holder, such as 602, a smart device, such as 610, lies in a plane, such as 612, elevated above, offset from, and parallel to a front surface, such as 713, of a king post, such as king post 712.

A collapsible, X frame, spring free, video game controller, chassis, such as 900, includes a plurality of top struts, such as top strut 708, and a plurality of bottom struts, such as bottom strut 710. A proximal end of each top strut and each bottom strut are preferably pinned to a king portion, such as king post 712 of an X frame, spring free, video game controller, chassis, such as 900 by a connection pin, such as 714. The term spring free above describes attributes of, for example, chassis 900 operating without the use of a spring to provide the collapsibility to the chassis 900. While a distal end of each top strut and each bottom strut are preferably pinned, by way of a connection pin, such as 714, to a pair of module support struts, such as module support struts 902 of an X frame, spring free, video game controller, chassis, such as 900. Next an input module attachment rail, such as input module attachment rail 904, is secured to each respective module support struts, such as module support struts 902, and a pair of wireless video game input modules, such as video game input modules 906 and 908, are manually removably secured to their respective module attachment rail, such as input module attachment rail 904.

Figure 64:
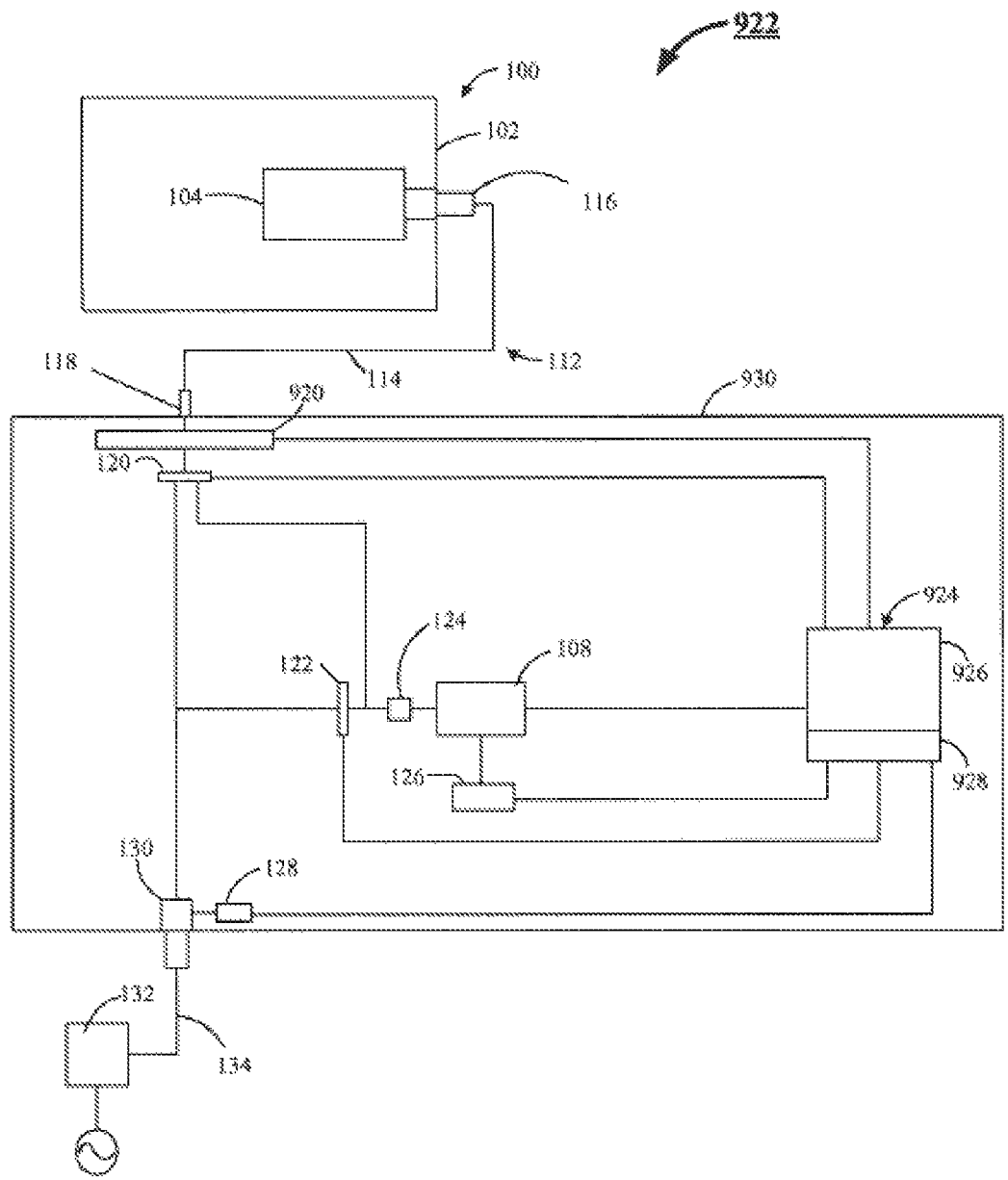
FIG. 64 is a block diagram of an embodiment of a video gaming system, which in a preferred embodiment features an operating system sensing circuit.

FIG. 64 shows a block diagram power management and power pass through circuit 100 ("PMPP"), which includes a operating system detection circuit 920 of an embodiment of a video gaming system 922. Said video gaming system 922, includes at least, but is not limited to, a processor 924, which provides at least a computing portion 926 and a memory portion 928. The video gaming system 922 further includes an energy storage device 104 within a computing device 102, while a video game controller 930 provides a second energy storage device 108. Said processor 924 communicates with a video game controller 930, said video game controller 930 provides at least, but is not limited to, a second energy storage device 108. Said PMPP 100 precludes a simultaneous bidirectional current flow between said computing device 102 and said video game controller 930.

In a preferred embodiment, the communication between the computing device 102 and the video game controller 930 is achieved via a wired connection circuit 112, however as one skilled in the art understands, communication between the computing device 102 and the video game controller 930 may be achieved wirelessly. The wired connection circuit 112 preferably includes a power and signal cable 114 (also referred to herein as cable 114). Cable 114 preferably provides a connector 116, which is specifically configured to interface with an interface connector 118, said interface connector 118 provides a predetermined number of contacts including, but not limited to, a power contact and a ground contact.

In a preferred embodiment, stored the memory portion 928 of the processor 924 is a plurality of video game centric operating systems (also known as multiple sets of firmware) for use in operating the video game controller 930, and controlling the interface between a plurality of input devices such as buttons 232 and a joystick 234 (FIG. 4) and computing device 102 Each set of firmware of the multiple sets of firmware is specific to an operating system of the computing device 102 (also referred to herein as a smart device 102).

Examples of firmware sets include: iOS compatible firmware compatible with Apple's iOS operating system (iOS is a proprietary mobile operating system that runs on mobile devices such as the iPhone, iPad, iPod Touch); Android compatible firmware compatible with Google's Android Operating System, which is software developed by Google; and then customized for various smart devices; or Mobil Linux compatible firmware compatible with Mobil Linux operating system (Mobil Linux is an operating system for smart devices and is an open source Operating System).

In an operation of an embodiment of a video gaming system, such as video gaming system 922, multiple different sets of firmware are preloaded into the memory portion 928 of the processor 924. Upon connection to a computing device, such as computing device 102, by a connection circuit, such as connection circuit 112, a operating system detection circuit, such as operating system detection circuit 920, determines the operating system being utilized by the connected computing device, such as computing device 102. In a preferred embodiment, the operating system detection circuit 920 analysis interface connector 118, which provides a predetermined number of contacts including, but not limited to, a power contact and a ground contact. Based on the physical location of those contacts presented by interface connector, the operating system detection circuit 920, directs the computing portion 926 of the processor 924 as to which video game controller operating system stored in the memory portion 928 of the processor is to be used to effectuate communication with the computing device 102.

Figure 65:
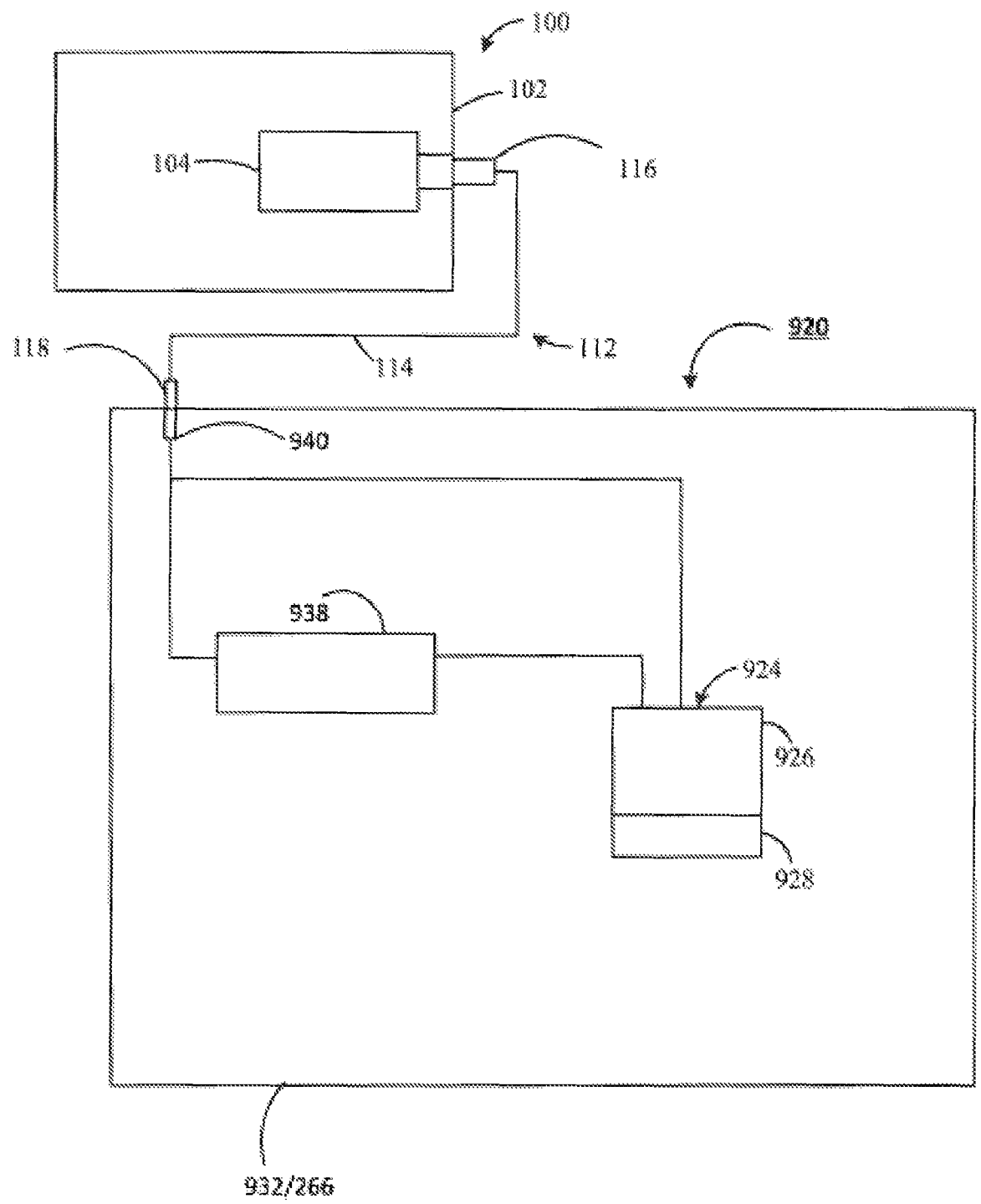
FIG. 65 shows a block diagram power management and power pass through circuit, which includes a operating system detection circuit.

FIG. 65 is a block diagram of the operating system detection circuit 920. Included by the operating system detection circuit 920 is a printed circuit board 932/266 shown as s separate printed circuit board, which mechanically communicates with printed circuit board assembly 266 (of FIG. 6). However, in a preferred embodiment an operating system detection integrated circuit 938 is mounted on a printed circuit board assembly 932/266. The operating system detection integrated circuit 938 is in electrical communication with the processor 924. The printed circuit board assembly 932/266 is housed within a cloud gaming controller housing 1018 (of FIG. 66). The operating system detection integrated circuit 938 is further in both mechanical and in electrical communication with the interface connector 118 of the as connection circuit 112, as shown by FIG. 63, which mechanically and electrically communicate the computing device 102.

The wired connection circuit 112, communicates power and signals between the computing device 102 and the video game controller 106. The wired connection circuit 112 preferably includes a power and signal cable 114 (also referred to herein as cable 114). Cable 114 preferably provides a first interface connector 116 on a first end, which is specifically configured to interface with the computing device 102, and a second interface connector 118, which is specifically configured to interface with the video game controller 106. Interface connector 118, provides a predetermined number of contacts including, but not limited to, a power contact, a ground contact, and at least a signal contact.

Figure 66:
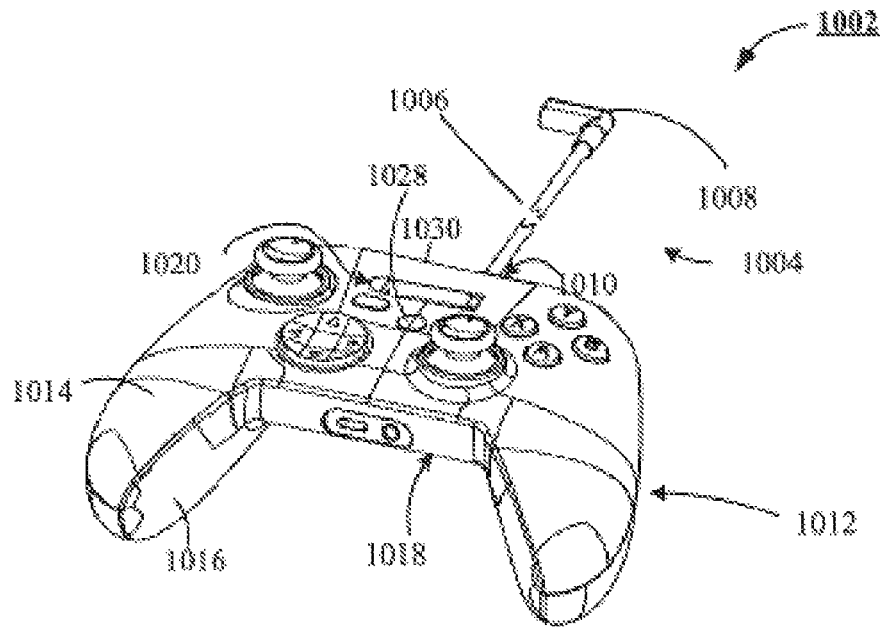
FIG. 66 is a block diagram of the operating system detection circuit that includes an operating system detection integrated circuit mounted to a printed circuit board.
Figure 67:
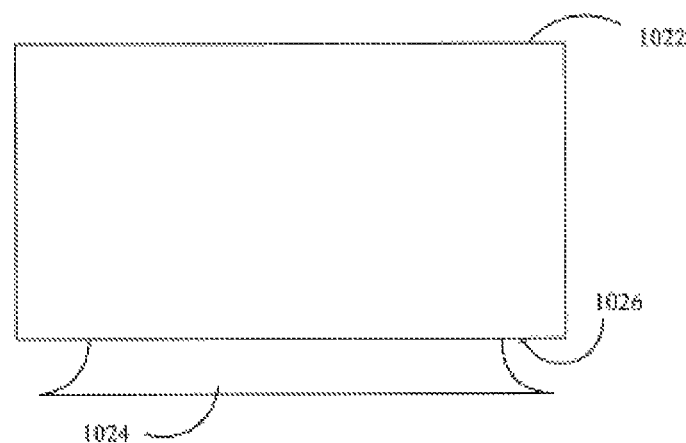
FIG. 67 shows a Wi-Fi enabled television set. The Wi-Fi enabled television set provides a video game controller communication port.

FIG. 66 shows a perspective view of an embodiment of a cloud gaming controller 1012 of a video gaming system 1002 configured for use with a smart device, such as a Wi-Fi enabled television set 1022 (also referred to herein as Wi-Fi TV 722) (of FIG. 67). The Wi-Fi TV 1022 preferably includes at least a support stand 1024 and provides a video game controller communication port 1026.

The cloud gaming controller 1012 is in electronic communication with said Wi-Fi TV 1022, and includes at least, but is not limited to, a cover portion 1014 and a base portion 1016. The cover portion 1014 when secured to the base portion 1016 forms a cloud gaming controller housing 1018 (also referred to herein as controller housing 1018). The cover portion further provides an aperture 1020 offset from a front edge 1030 of the cover portion 1014.

In a preferred embodiment, communication between the Wi-Fi TV 1022 and the cloud gaming controller 1012 is achieved via a wired connection circuit 1004, however as one skilled in the art understands, communication between the Wi-Fi TV 1022 and the cloud gaming controller 1012 may be achieved wirelessly. The wired connection circuit 1004 preferably includes a power and signal cable 1006 (also referred to herein as cable 1006). Cable 1006 preferably provides a connector 1008, which is specifically configured to interface with a cloud gaming communication port 1026 (of FIG. 67) as well as an interface connector 1010. Said interface connector 1010 provides a predetermined number of contacts including, but not limited to, a power contact and a ground contact. The interface connector 1010 is specifically configured to interface with a mating connector 940 (of FIG. 65). Said mating connector 940 is mounted on the printed circuit board 932/266 (of FIG. 65), and mechanically and electronically communicate with the operating system detection integrated circuit 938 (of FIG. 65).

Further shown by FIG. 66 is a cloud gaming activation button 1028 adjacent aperture 1020. An activation of the cloud gaming activation button 1028 signals the Wi-Fi TV 1022 to establish a communication link with the cloud to gain access to a plethora of video game stored in the cloud and compatible with the cloud gaming controller 1012.

Figure 68:
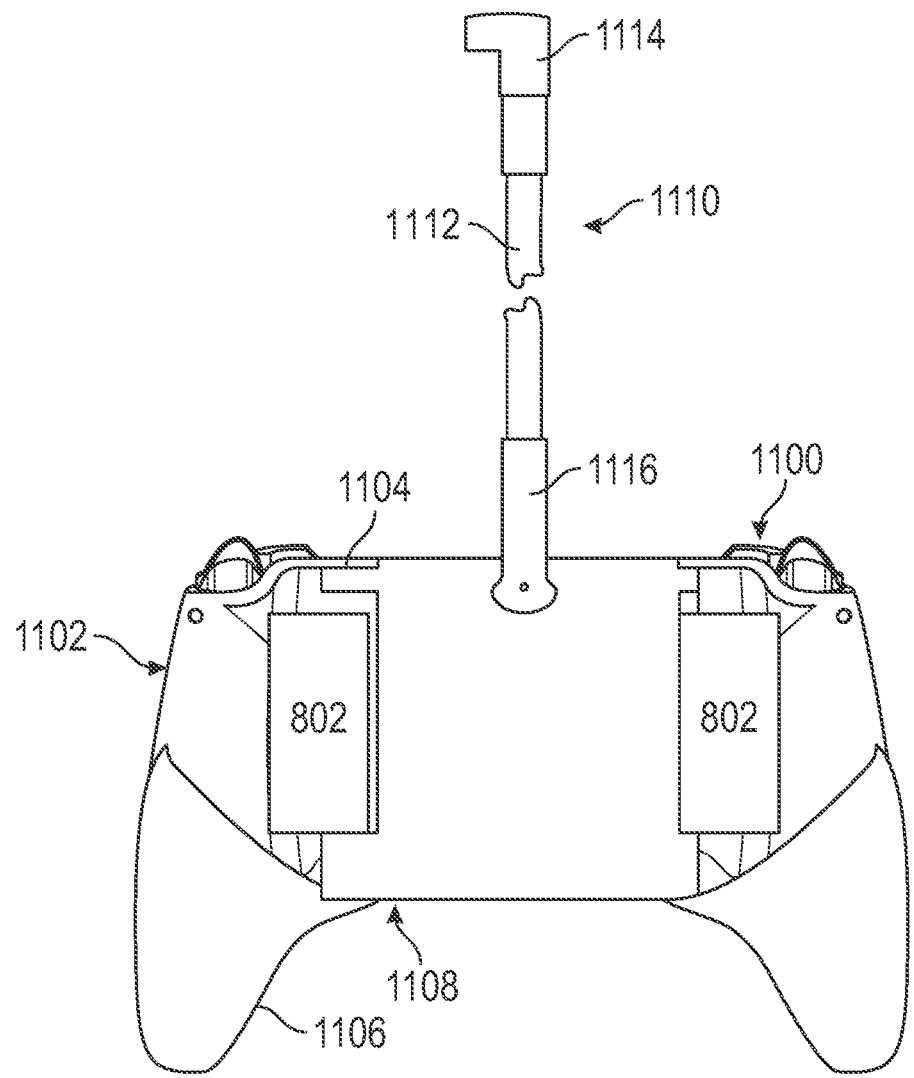
FIG. 68 shows a bottom plan view of a cloud gaming controller of a cloud gaming system.

FIG. 68 shows a bottom plan view of a cloud gaming controller 1102 of a cloud gaming system 1100. Said cloud gaming controller 1102 is in electronic communication with said Wi-Fi TV 1022 (of FIG. 67), and includes at least, but is not limited to, a cover portion 1104 and a base portion 1106. The cover portion 1104 when secured to the base portion 1106 forms a video game controller housing 1108 (also referred to herein as controller housing 1108). The communication between the Wi-Fi TV 1022 and the cloud gaming controller 1102 is achieved via a wired connection circuit 1110, however as one skilled in the art understands, communication between the Wi-Fi TV 1022 and the cloud gaming controller 1012 may be achieved wirelessly. The wired connection circuit 1110 preferably includes a power and signal cable 1112 (also referred to herein as cable 1112). Cable 1112 preferably provides a connector 1114, which is specifically configured to interface with a cloud gaming communication port 1026 (of FIG. 67) as well as an interface connector 1010. Said interface connector 1010 provides a predetermined number of contacts including, but not limited to, a power contact and a ground contact. The interface connector 1010 is specifically configured to interface with a mating connector 940 (of FIG. 65). Said mating connector 940 is mounted on the printed circuit board 932/266 (of FIG. 65), and mechanically and electronically communicate with the operating system detection integrated circuit 938 (of FIG. 65).

Figure 69:
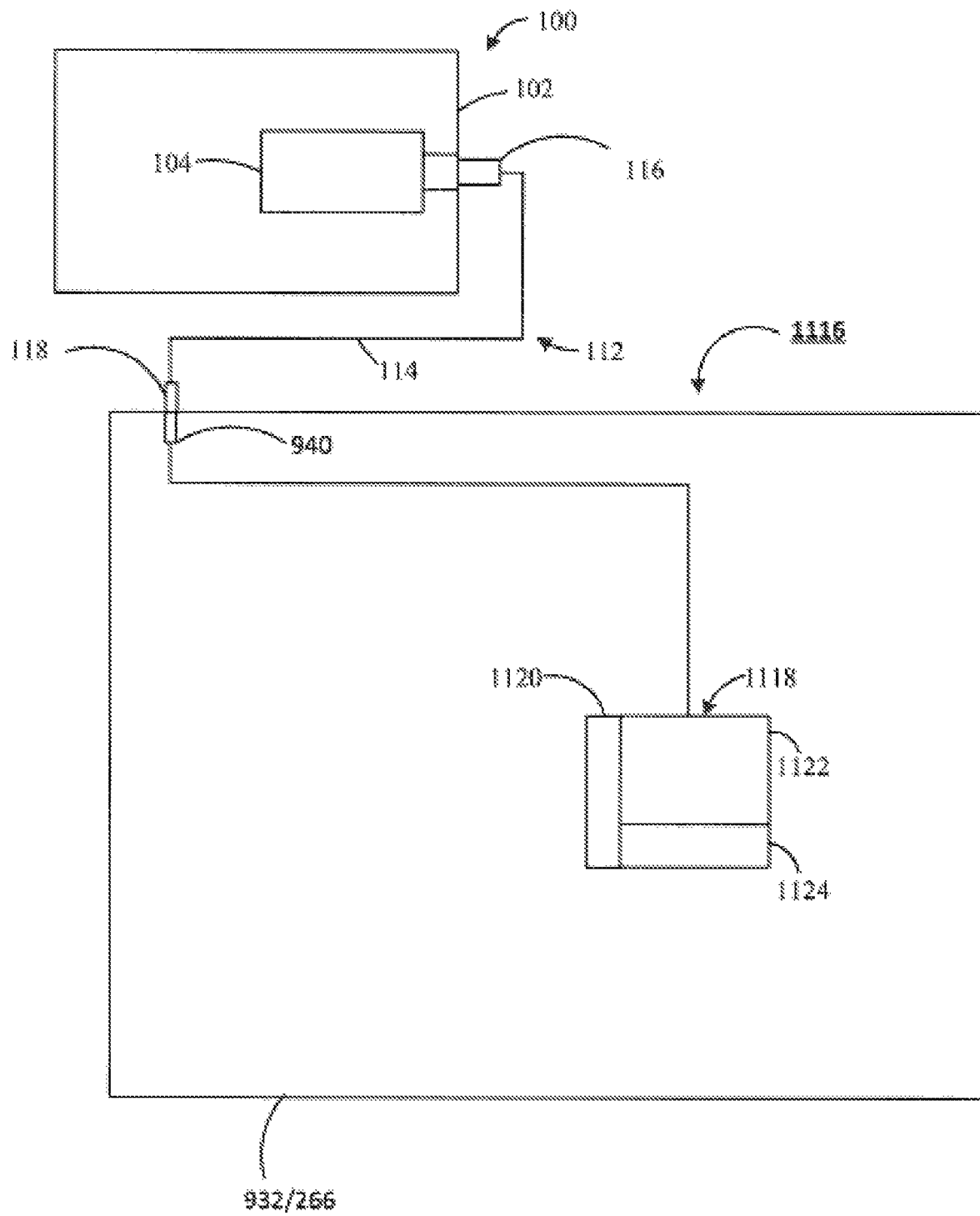
FIG. 69 is a block diagram of a video game controller, said video game controller includes a processor is with embedded operating system detection firmware.

FIG. 69 is a block diagram of a video game controller 1116 in electronic communication with a smart device (e.g., smart device 102). Said video game controller 1116 includes a processor 1118 with embedded operating system detection firmware 1120. Said processor 1118 further includes a computer portion 1122 and a memory portion, said memory portion stores multiple firmware sets. When said video game controller 1116 is connected to said smart device, said embedded operating system detection firmware 1120 detects which operating system, of a plurality of smart device operating systems, operates said smart device. Said embedded operating system detection firmware 1120 further selects, from said multiple firmware sets stored in said memory 1124 of said processor 1118, a firmware set compatible with said detected operating system of said smart device. Said embedded operating system detection firmware 1120 still further directs loading of said selected firmware set onto said computing portion 1122 of said processor 1118. Said selected firmware set actively interacts with said detected operating system of said smart device during game play of a video game, said video game displayed on a viewing screen of said smart device.

Figure 70:
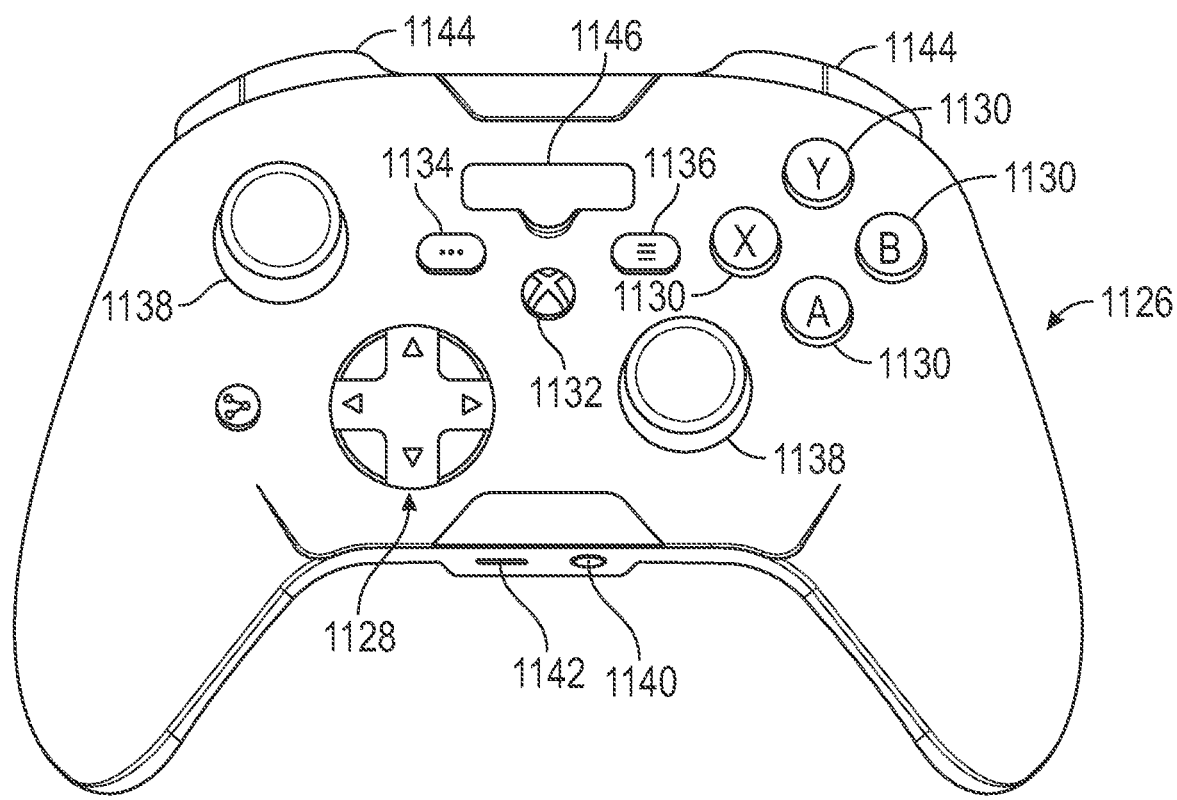
FIG. 70 shows a top view of a controller.

FIG. 70 illustrates another example of a controller 1126. The controller 1126 can be a handheld controller, such as a video game controller. As illustrated, the controller 1126 includes a number of user inputs that allow a user to interact with the controller 1126. The user inputs (i.e., game controller inputs) can include, for example, either digital switches or analog position encoder switches which can be combined with buttons or triggers to create control surfaces. Inputs to the digital switches report status using a 1-bit value. For example, the digital switches report a "0" when not depressed and a "1" when depressed (e.g., fully depressed to their mechanical limit).

In contrast, analog inputs are reported via the analog position encoder by using an unsigned n-bit integer to correspond to a user input. In some examples, "n" corresponds to an integer value of eight or an integer value greater than eight. Additionally, the analog position encoders reports a value of "0" when not depressed or, for example, 2n−1 when depressed (e.g., fully depressed to its mechanical limit). Additionally, the analog position encoders can report values between 0 and 2n−1 inclusive on a linear scale throughout the control surface's range of motion. In some embodiments, the controller 1126 can also include, for example, position encoders, which may be implemented using potentiometers, Hall effect sensors, or the like. Furthermore, while the controller 1126 is described herein, it should be noted that the elements described hereafter can be applied to other types of controllers, for example, remote controls for televisions or other types of handheld controllers, including drone controllers.

FIG. 70 includes a set of user inputs, which will be described in greater detail below. It should be noted that the user inputs illustrated in FIG. 70 are examples of types of user inputs and that some or all of these user inputs can be removed, adjusted, and/or alternative user inputs can be employed in conjunction with the controller 1126. As illustrated in FIG. 70, the controller 1126 employs various user inputs, which include, for example, a directional pad 1128, face buttons 1130, a home button 1132, an options button 1134, a menu button 1136, and joysticks 1138. As illustrated, the directional pad 1128 is implemented as one circular button, however, alternate shapes, for example, omitting the circular portion of the directional pad 1128 and instead providing only buttons in a "cross-shaped" formation can be employed. In some embodiments, the diameter of the directional pad 1128 may be at least, for example, 15 mm, 16 mm, 17 mm, or another value. The directional pad 1128 can include a raised cross-shaped formation that includes one or more buttons whereby each respective portion of the cross-shaped formation corresponds to a primary direction (e.g., up, down, left, and right). In some embodiments, this cross-shaped formation (or region) of the directional pad 1128 can be part of the surface of the controller 1126.

The directional pad 1128 can be is oriented within 5° of the controller 1126 axis. Additionally, as noted above, each primary direction is labeled with an arrow that corresponds to the respective portion of the cross-shaped formation of the directional pad 1128. Additionally, each respective portion of the cross-shaped formation of the directional pad 1128 is associated with a respective digital switch to receive inputs as digital inputs to the controller 1126. In some embodiments, the actuation force of the directional pad 1128 to generate a digital input can be, for example, approximately 1.0 N, 1.2 N, or another value. In operation, the directional pad 1128 pivots in all directions along the face of the controller 1126 and does not translate in any direction. Moreover, the mechanical design of the directional pad 1128 can insure that opposing primary directions (for example, up/down or left/right) cannot be depressed simultaneously. This design allows users to smoothly, quickly, and accurately generate desired primary positions (e.g., up, down, left, and right) and inter-primary positions (e.g., up-right, down-right, up-left, down-left) when interacting with the controller 1126 via the directional pad 1128.

The controller 1126 of FIG. 70 also includes face buttons 1130 as user inputs. The face buttons 1130 contains four circular buttons oriented at 90° in a diamond layout. However, fewer or greater than four face buttons 1130 can be employed and can be laid out in a different configuration and can have non-circular shapes. The face buttons 1130, as illustrated, have a diameter of at least, for example, approximately 5 mm, 6 mm, or another value, and the layout of the face buttons 1130 may be, for example, approximately at least 20 mm in diameter or another value. In some embodiments, the face buttons 1130 can be oriented within 5° of the controller 1126 axis. Furthermore, the face buttons 1130 can be labeled. For example, the face buttons 1130 can be labeled 'A', 'B', 'X', and 'Y' in all capital letters matching the layout as illustrated in FIG. 70.

Additionally, each respective button of the face buttons 1130 is associated with a respective digital switch to receive inputs as digital inputs to the controller 1126. In some embodiments, the actuation force of the face buttons 1130 to generate a digital input can be, for example, approximately 0.5 N, 0.6 N, 0.65 N, or another value. In operation, the directional pad 1128 pivots in all directions and does not translate in any direction. Moreover, the mechanical design of the directional pad 1128 can insure that opposing primary directions (for example, up/down or left/right) cannot be depressed simultaneously. This design allows users to smoothly, quickly, and accurately generate desired primary positions (e.g., up, down, left, and right) and inter-primary positions (e.g., up-right, down-right, up-left, down-left) when interacting with the controller 1126 via the directional pad 1128.

As previously noted, the controller 1126 of FIG. 70 also includes a home button 1132, an options button 1134, and a menu button 1136 as user inputs. The home button 1132 can be circular (or another shape) and can have a diameter of at least, for example, approximately 8 mm, 10 mm, or another value. Furthermore, the home button 1132 can be labeled. For example, the home button 1132 can be labeled 'X', can have a triangle disposed atop a square to represent "home" to the user, or can use a different label.

The options button 1134 and the menu button 1136 can be oval (or another shape) and can have a height of at least, for example, approximately 2 mm, 3 mm, or another value and a width of, for example, approximately 5 mm, 6 mm, or another value. Furthermore, the options button 1134 and the menu button 1136 can be labeled. For example, the options button 1134 can be labeled with three dots while the menu button 1136 can be labeled with three vertically aligned dashes. However, other labels can be used, including labels disposed adjacent to the options button 1134, the menu button 1136, and/or the home button 1132.

Additionally, each of the respective home button 1132, the options button 1134, and the menu button 1136 is associated with a respective digital switch to receive inputs as digital inputs to the controller 1126. In some embodiments, the actuation force of the home button 1132, the options button 1134, and the menu button 1136 to generate a digital input can be the same value or can be different values. For example actuation forces for each of the home button 1132, the options button 1134, and the menu button 1136 to generate a digital input can be approximately between 1.0 N and 4 N, 1.2 N and 3.5 N or another value, for example, approximately 1.0 N, 1.2 N, 1.5 N, 2.0 N, 2.5 N, 3 N, 3.5 N, or another value.

The controller of FIG. 70 also includes joysticks 1138. While two joysticks 1138 are illustrated, it should be noted that the placement and/or number of joysticks 1138 employed can be altered from those represented in FIG. 70. The joysticks 1138, as illustrated, have a circular outline with a diameter of at least, for example, approximately 8 mm, 10 mm, or another value. Additionally, each respective joystick of the joysticks 1138 of the face buttons 1130 is associated with a respective analog position encoder to receive inputs as analog inputs to the controller 1126. In some embodiments, the respective analog position encoders can be potentiometers, Hall effect sensors, or the like.

The joysticks 1138 can additionally operate as clickable triggers (e.g., corresponding to an "L3" and "R3" button of the controller 1126). Actuation of the respective joysticks 1138 towards the face of the controller 1126 (i.e., into the controller 1126 from the prospective of a user) operates to effect the respective trigger operation. The joysticks 1138 can each be associated with a respective digital switch to receive these trigger inputs as digital inputs to the controller 1126 (in addition to the analog positon encoders that receive inputs corresponding to movement of the joysticks in directions about the face of the controller 1126). In operation, the actuation force of the joysticks 1138 to generate a digital input can be, for example, approximately 0.5 N, 0.6 N, 0.65 N, or another value.

In operation, maximum displacement of the joysticks 1138 in any given direction (e.g., primary positions of up, down, left, and right, inter-primary positions of up-right, down-right, up-left, down-left, or other positions) can be symmetrical to the opposite direction. The joysticks 1138 can be capable of rotation to at least, for example, 15° or another value and up to, for example, 40° or another value. The joysticks 1138 can move (e.g., translate) at a minimum of, for example, approximately 3 mm or another value in all directions with respect to the face of the controller 1126). In operation, the actuation force of the joysticks 1138 to reach maximum travel in any direction can be, for example, approximately 0.5 N and 1.5 N, 0.7 N and 1.3 N, or another value. Additionally, the actuation force of the joysticks 1138 to generate an analog input can be, for example, approximately 0.1 N, 0.2 N, 0.3 N, 0.4 N, 0.5 N, or another value.

In operation, the joysticks 1138 report a full range of movement between the unit circle and unit square using two signed n-bit integers where n has a value of, for example, eight or more. The signed n-bit integers can each respectively be associated with one of the X-axis and the Y-axis, as disposed across the face of the controller 1126. Each axis reports a full range of values between $-2n-1+1$ and $+2n-1-1$, inclusive, on a linear scale. The values are linearly reported with respect to physical displacement or angular displacement of the joysticks 1138. In this manner, extreme sensitivity and/or sluggishness in response to small control deflections or forces can be avoided. At rest, the joysticks 1138 report (0,0) for the X and Y axes respectively. Thereafter, the breakout force to initiate values greater than (0,0) from the rest state is, for example, no greater than 30% of the force at maximum output (i.e., the actuation force of the joysticks 1138 to reach maximum travel in any direction). Additionally, a dead zone of the joysticks 1138 can be set, for example, at a maximum of approximately 5% of total maximum travel of the joysticks 1138.

Additional inputs may be present in the controller 1126. For example, an auxiliary input 1140 can be provided to allow for headphones to be connected to the controller 1126. Likewise, a connection input 1142, for example a lightning connector input, a usb connector input, or another data and/or power connection input can be provided in controller 1126. Furthermore, shoulder buttons 1144 can be disposed on the shoulder of the controller 1126. These shoulder buttons 1144 will be described in greater detail with respect to FIG. 71.

FIG. 70 also can optionally include an aperture 1146. Aperture 1146 can be provided in the controller 1126 to allow for a stand to be connected to the controller 1126. The aperture 1146 can be covered with a removable covering made of plastic, rubber or another material. When the covering is removed, the aperture 1146 is able to receive a stand that can hold, for example, a mobile device (e.g., a phone, tablet, or other portable electronic device) to allow for mobile gaming on the mobile device as controlled by the controller 1126. In some embodiments, the mobile device can be connected via a cable to the controller 1126. Alternatively and/or additionally, the mobile device can be connected wirelessly (e.g., using a Bluetooth connection or a different tuned frequency) to the controller 1126.

Figure 71:
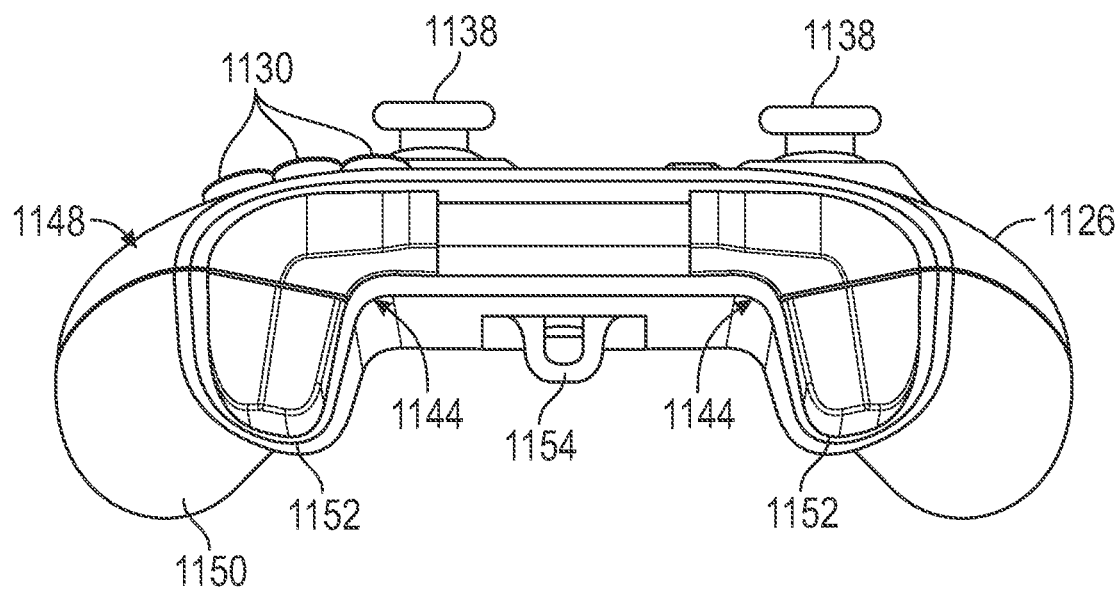
FIG. 71 shows a side view of the controller of FIG. 70.

FIG. 71 illustrates a side view of the controller 1126. As illustrated, the controller 1126 can include a front face 1148 and a rear face 1150 that can be combined as an enclosure of the controller 1126. Additionally, the shoulder buttons 1144 of the controller 1126 are visible in greater detail. The shoulder buttons 1144 can correspond to an "L1" and "R1" button of the controller 1126, respectively. Additionally, triggers 1152 of the controller 1126 are illustrated. The triggers 1152 can correspond to an "L2" and "R2" button of the controller 1126, respectively.

In some embodiments, each of the respective shoulder buttons 1144 are associated with a respective digital switch to receive inputs as digital inputs to the controller 1126. The actuation forces for the shoulder buttons 1144 can be for example, approximately 0.5 N, 0.65 N, or another value. Additionally, each of the respective triggers 1152 are associated with a respective analog position encoder to receive inputs as analog inputs to the controller 1126. In some embodiments, the respective analog position encoders can be potentiometers, Hall effect sensors, or the like. When position encoders are utilized as the analog position encoders, analog values over a minimum linear travel of, for example, approximately 5 mm or another value may generate a corresponding analog signal.

FIG. 71 also illustrates a connector input 1154. This connector input 1154 can connect to a cable that transmits power and/or signals generated by the controller 1126 to an electronic device. This electronic device can be a mobile device (e.g., a phone, tablet, or other portable electronic device), a video game console, a television or other display, a computer, a monitor, or another electronic device. In other embodiments, no cable connection is provided between the controller and the electric device and the connector input 1154 can be omitted. Instead, the controller 1126 can wireless transmit and receive signals from a corresponding electronic device, such as a mobile device (e.g., a phone, tablet, or other portable electronic device), a video game console, a television or other display, a computer, or another electronic device.

Figure 72:
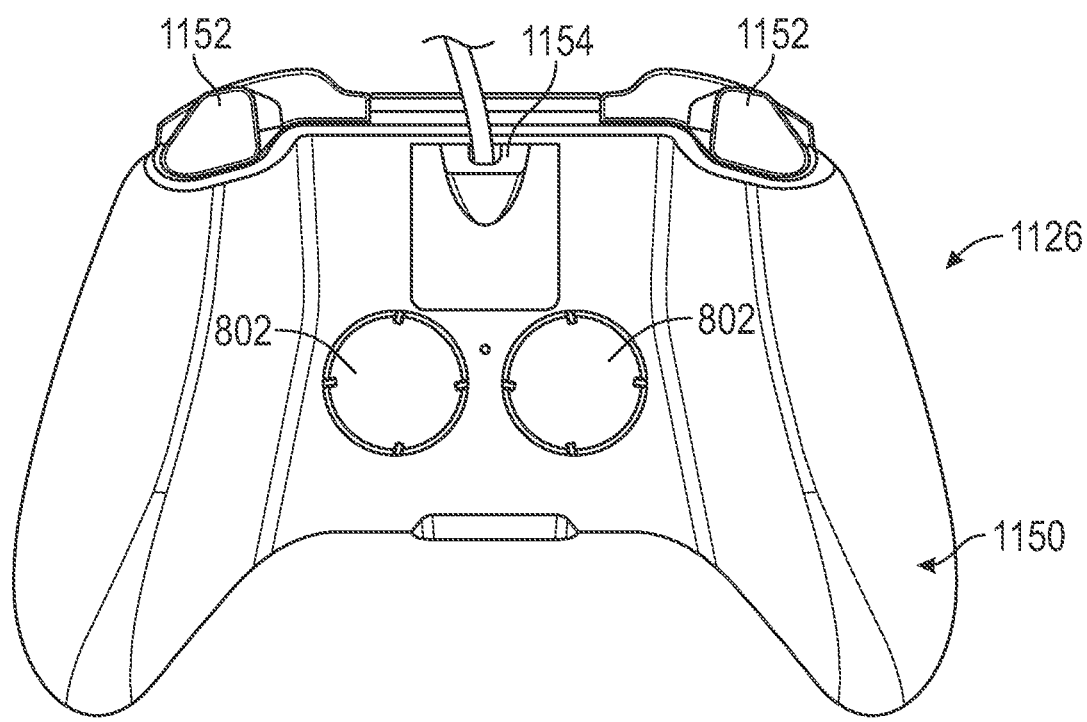
FIG. 72 shows a bottom view of the controller of FIG. 70.

Various user inputs have been described in conjunction with the controller 1126. However, it may be advantageous to provide for additional inputs for a user to interact with. Accordingly, as illustrated in FIG. 72, the controller 1126 can include one or more touch sensitive screens 802 disposed in or on (or otherwise secured to) the rear face 1150 of the controller 1126. In this manner, the touch sensitive screens 802 are in electrical communication with and mechanically secured to the controller 1126. The output signal of each of the touch sensitive screens 802 responds in a plurality of ways, depending on a direction of a swipe (up or down vertically, of back or forth horizontally). Additionally, tapping on a top portion, or a bottom portion of the touch sensitive screens 802 generates on alternate single type than at obtained by a directionally centric swipe.

In some embodiments, the touch sensitive screens 802 can provide additional inputs to the controller 1126. Additionally and/or alternatively, the touch sensitive screens 802 can be mapped to one or more of the user inputs of the controller 1126. That is, each of the touch sensitive screens 802 can be assigned (e.g., by the user or automatically in conjunction with instructions from the electronic device connected to the controller) to operate as one of the respective user inputs of the controller 1126. For example, each of the touch sensitive screens 802 can be respectively assigned to correspond to a digital user input, such as the directional pad 1128, one of the face buttons 1130, or one or the shoulder buttons 1144. Alternatively, each of the touch sensitive screens 802 can be respectively assigned to correspond to an analog user input, such as the one of the joysticks 1138 or one of the triggers 1152. Furthermore, one of the touch sensitive screens 802 can be respectively assigned to correspond to a digital user input, such as the directional pad 1128, one of the face buttons 1130, one of the shoulder buttons 1144, while the other one of the touch sensitive screens 802 can be respectively assigned to correspond to an analog user input, such as the one of the joysticks 1138 or one or the triggers 1152. In this manner, the directional pad 1128 can be programmed to replace (or clone) digital and analog inputs of the controller 1126.

Additionally, in some embodiments, once the touch sensitive screens 802 are programmed (e.g., mapped to respective user inputs), the user inputs that are assigned to the touch sensitive screens 802 can be disabled in the controller 1126. That is, the controller 1126 can block or otherwise ignore signals from the user inputs that are assigned to the touch sensitive screens 802. Alternatively, in some embodiments, once the touch sensitive screens 802 are programmed (e.g., mapped to respective user inputs), the user inputs that are assigned to the touch sensitive screens 802 remain enabled in the controller 1126. That is, the controller 1126 can receive signals from either the user inputs or the assigned touch sensitive screens 802. However, for this embodiment, if a user provides input to both of the assigned touch sensitive screen 802 and its corresponding user input, the controller 1126 may operate to receive only one of the signals generated in response to the user inputs. For example, the controller 1126 can default to accepting the input from the user input and block the input from the assigned touch sensitive screen 802 when both are depressed or otherwise manipulated by a user simultaneously.

As noted above, a user can re-direct/adjust a setting of any user input of the controller 1126 to the touch sensitive screens 802. Accordingly, a user setting graphical interface may be presented to a user on an electronic device connected to the controller that allows a user to remap or otherwise assign the touch sensitive screens 802. When a respective joystick 1138 is mapped to each of the touch sensitive screens 802, different user movements may correspond to different inputs on the touch sensitive screens 802. For example, an up/down movement (finger from top to bottom or bottom to top 0-127), a left/right (finger from left to right or right to left 0-127), and a press down (finger press down as 0, putting pressure on a respective touch sensitive screen 802 to increase from 0-127) can be programmed to the controller 1126 to mirror the inputs available via the joysticks 1138. Furthermore, calibration of the touch sensitive screens 802 may be performed. For example, there may be portion of the user setting graphical interface that requests interactions from the user with the controller 1126 and based on the inputs received, calibrates the functionality and/or operation of the touch sensitive screens 802. Similarly, the user setting graphical interface may allow for turning on and off the touch sensitive screens 802 in addition to allowing for the selection of the respective user input that is mapped or assigned to the respective touch sensitive screens 802. For example, the touch sensitive screens can be set to a default setting of off in which the touch sensitive screens are inactive until turned on and assigned by the user or by interaction with the electronic device connected to the controller (e.g., assigned via a command received by a gaming console).

The user settings graphical interface can assist in configuring or setting up the controller 1126. In other embodiments, the connected electronic device can configure or setup the controller 1126 and/or the controller 1126 can be programmed with default settings. These include the ability to map and remap (assign and reassign) the touch sensitive screens 802, allowing for adjustment and/or provide programmable and adjustable response time and/or a response curve for the touch sensitive screens 802 (e.g., when an analog is mapped). Additionally, default settings for the controller 1126 can be set (e.g., a user finger touch pointing can be set as "0" when finger pull out and re-position on the touch sensitive screens 802, the input restarts again from "0".)

Furthermore, in one embodiment, the touch sensitive screens 802 can be capacitive touch screens. In another embodiment, the touch sensitive screens 802 are resistive touch screens. Additionally, in some embodiments, the controller 1126 includes a vibration motor (or respective vibration motors), which provide feedback to user while using the touch sensitive screens 802. In this manner, the touch sensitive screens 802 can provide haptic feedback to a user when the user interacts with the touch sensitive screens 802. Thus, to utilize this feature of the controller 1126, when using a touch sensitive screen 802, an additional channel may be provided by a controller (e.g., an integrated circuit or CPU of the controller 1126) to allow for transmission of a signal to the vibration motors to provide haptic to the user.

When the assignment of a touch sensitive screen 802 is from a digital user input (e.g., a digital input), for example, corresponding to a face button 1130 or a shoulder buttons 1144, the vibration motor provides short, single feedback to the interacted with touch sensitive screen 802. Likewise, when the assignment of a touch sensitive screen 802 is from an analog user input (e.g., an analog input), for example, corresponding to a joystick 1138 or a trigger 1152, the feedback provided to the user can be consistent. These haptic responses can also be programmable, such that particular patterns of vibration can be mapped to respective user inputs for the touch sensitive screens. Thus, for example, for a digital button mapping of the touch sensitive screens 802, the response to each click by a user can be a short, clear, clean feedback and the responsiveness can be defined. Alternatively for an analog button mapping of the touch sensitive screens 802, a vibrating response can accompany with the analogy up/down from 0-127. Furthermore, the responsiveness can be defined (e.g., as preset values or as selectable levels or responsiveness). Moreover, the haptic feedback can be selectively enabled and disabled. Thus, for example, power consumption management can be improved by providing for the haptic feedback of the controller 1126 being selectably disabled.

Figure 73:
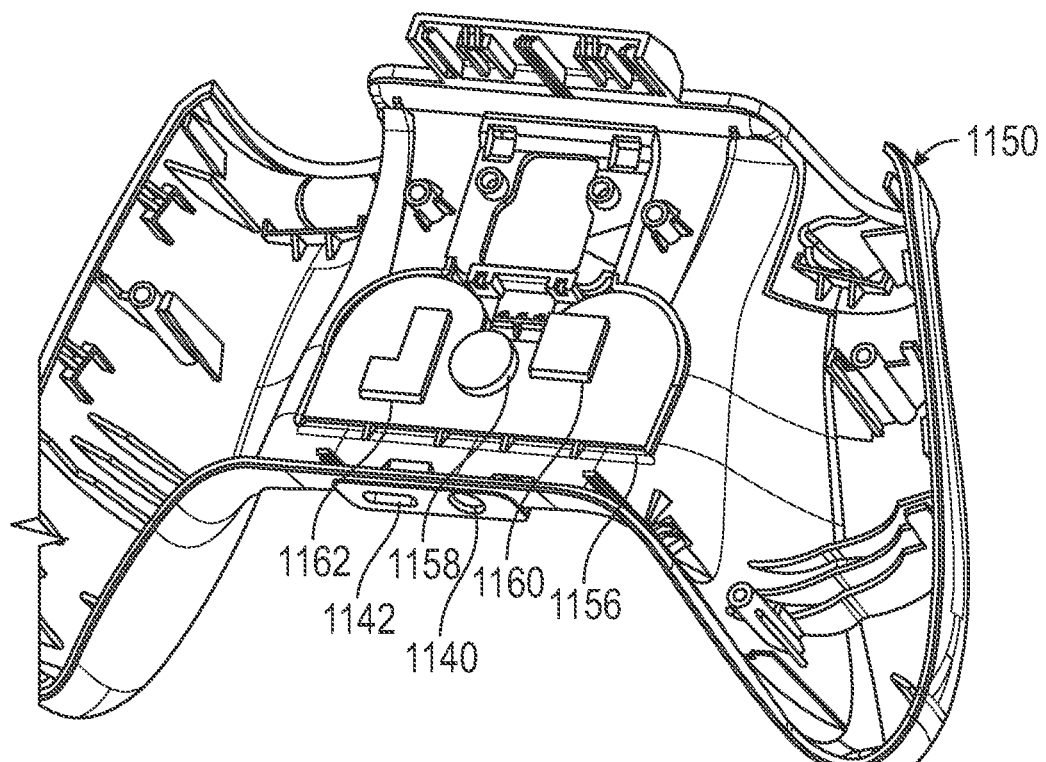
FIG. 73 shows a view of the internal portion of the bottom enclosure of the controller of FIG. 70.
Figure 74:
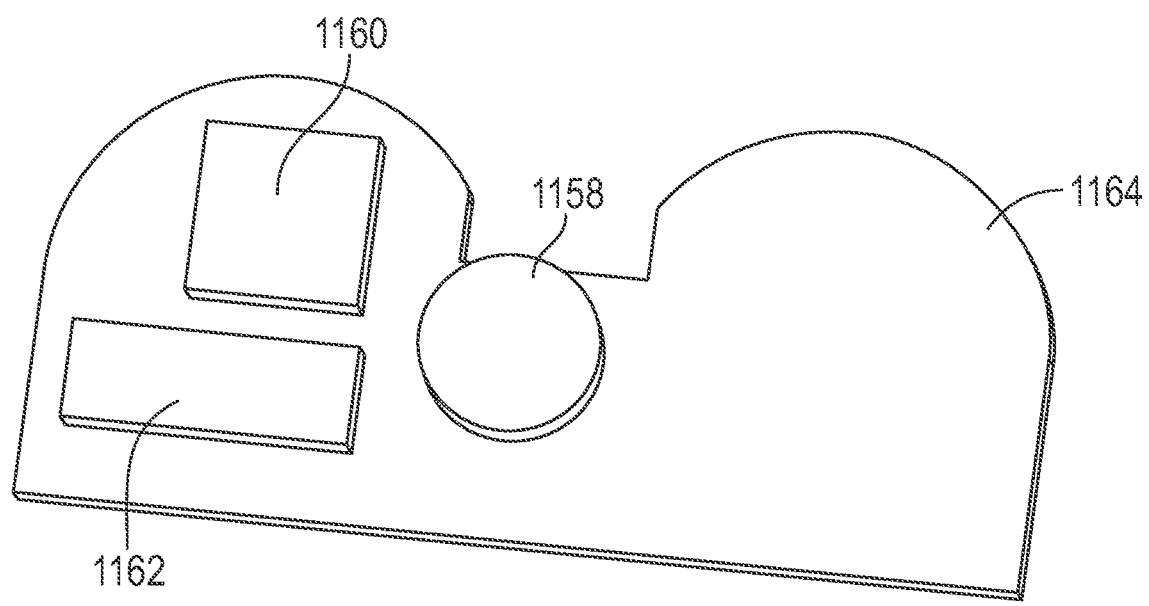
FIG. 74 shows a second embodiment of the printed circuit board of the controller of FIG. 73.

Turning to FIG. 73, an internal portion of the rear face 1150 of the controller 1126 is illustrated. FIG. 73 includes an example of a printed circuit board 1156 that operates in conjunction with the touch sensitive screens 802. The printed circuit board 1156 includes a vibration motor 1158 to allow for the haptic feedback described above. The printed circuit board 1156 also includes a chipset integrated circuit 1160 (e.g., an IC or CPU) for the touch sensitive screens 802. Additionally, the printed circuit board includes a connector 1162 (e.g., a cable connector) that allows for connection to a main printed circuit board of the controller 1126 for signal transmission therebetween. However, this layout of the printed circuit board 1156 can be altered. For example, FIG. 74 illustrates an alternate printed circuit board 1164 that includes the vibration motor 1158, the chipset integrated circuit 1160, and the 1162. Moreover, the layout of the touch sensitive screens 802 can be altered.

Figure 75:
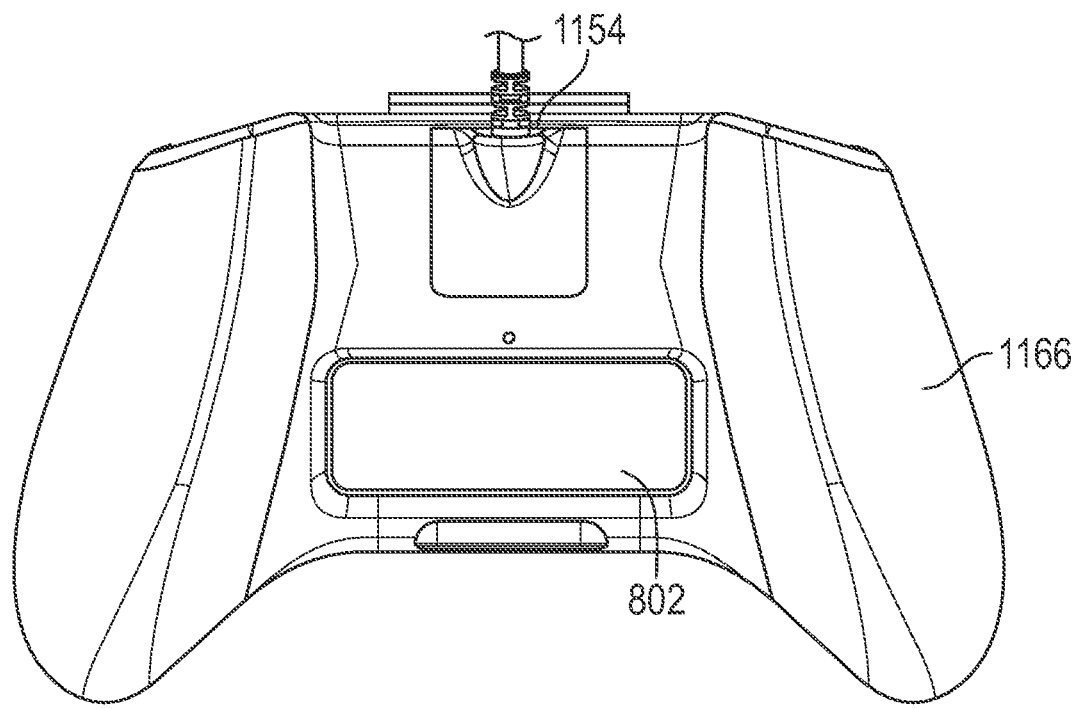
FIG. 75 shows a bottom view of a second embodiment of a controller.

FIG. 75 illustrates a second embodiment of a controller 1166. The controller 1166 can be similar to the controller 1126. However, the controller 1166 illustrates a single touch sensitive screen 802. This single touch sensitive screen 802 of the controller 1166 can correspond to (i.e., can be mapped or assigned to) a single user input. In other embodiments, the single touch sensitive screen 802 of the controller 1166 can be apportioned or otherwise divided to allow for portions of the single touch sensitive screen 802 to correspond to two or more user inputs. For example, the single touch sensitive screen 802 of the controller 1166 can be divided in half to allow for a left portion and a right portion of the single touch sensitive screen 802. This provides effectively for two touch sensitive inputs to be assigned to the single touch sensitive screen 802 of the controller 1166. Alternatively, the single touch sensitive screen 802 of the controller 1166 can be divided in thirds to allow for a left portion, a right portion, and a center portion of the single touch sensitive screen 802. This provides effectively for three touch sensitive inputs to be assigned to the single touch sensitive screen 802 of the controller 1166. Thus, the embodiment of the controller 1166 can provide for additional flexibility in button assignment.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A device, comprising:
   a first user input;
   a digital switch coupled to the first user input, wherein the digital switch in operation generates a first signal in response to a first user interaction with the first user input;
   a second user input;
   an analog position encoder switch coupled to the second user input, wherein the analog position encoder switch in operation generates a second signal in response to a second user interaction with the second user input, wherein the second signal comprises an unsigned n-bit integer that corresponds to the second user interaction with the second user input; and
   a touch input disposed on a rear face of the device, wherein the touch input is selectively programmable to correspond to one of the first user input or the second user input, whereby when the touch input is selectively programmed to correspond to the second user input, the analog position encoder switch in operation generates a third signal in response to a third user interaction with the touch input, wherein the third signal comprises a second unsigned n-bit integer that corresponds to a type of interaction as the third user interaction with the touch input.

2. The device of claim 1, wherein the device comprises a controller coupled to the digital switch and the analog position encoder switch.

3. The device of claim 2, wherein the controller when in operation filters the first signal when the touch input is selectively programmed to correspond to the first user input to block the first signal from being processed by the controller.

4. The device of claim 2, wherein the controller when in operation processes the first signal when the touch input is selectively programmed to correspond to the first user input when a fourth signal is generated in response to a fourth user interaction with the touch input at a common time as the first signal is generated.

5. The device of claim 2, wherein the controller when in operation filters the second signal when the touch input is selectively programmed to correspond to the second user input to block the second signal from being processed by the controller.

6. The device of claim 2, wherein the controller when in operation processes the second signal when the touch input is selectively programmed to correspond to the second user input when a fourth signal is generated in response to a fourth user interaction with the touch input at a common time as the second signal is generated.

7. The device of claim 2, comprising a vibration motor coupled to the controller and the touch input, wherein the vibration motor when in operation generates haptic feedback on the touch input.

8. The device of claim 7, wherein the controller when in operation controls the vibration motor in conjunction with a first haptic feedback pattern as the haptic feedback on the touch input when the touch input is selectively programmed to correspond to the first user input.

9. The device of claim 8, wherein the controller when in operation controls the vibration motor in conjunction with a second haptic feedback pattern as the haptic feedback on the touch input when the touch input is selectively programmed to correspond to the second user input.

10. The device of claim 1, comprising a second digital switch coupled to the touch input and a second analog position encoder coupled to the touch input.

11. The device of claim 10, wherein the second digital switch in operation generates a fourth signal in response to a fourth user interaction with the touch input when the touch input is selectively programmed to correspond to the first user input.

12. The device of claim 11, wherein the second analog position encoder in operation generates a fifth signal in response to a fifth user interaction with the touch input when the touch input is selectively programmed to correspond to the second user input.

13. The device of claim 1, wherein the touch input generates an output signal that corresponds to a type of user interaction with the touch input.

14. The device of claim 1, comprising a second touch input, wherein the second touch input is selectively programmable to correspond to one of the first user input or the second user input.

15. A device comprising:
a first user input comprising a digital input;
a second user input comprising an analog input;
a first touch input disposed in a first region of a rear face of the device, wherein the first touch input is selectively programmable to correspond to one of the first user input or the second user input; and
an analog position encoder switch coupled to the first touch input, wherein when the first touch input is selectively programmed to correspond to the second user input, the analog position encoder switch in operation generates a signal in response to a user interaction with the first touch input, wherein the signal comprises an unsigned n-bit integer that corresponds to a type of interaction as the user interaction with the touch input.

16. The device of claim 15, comprising a third user input comprising a second analog input.

17. The device of claim 16, comprising a second touch input disposed in a second region of the rear face of the device, wherein the second touch input is selectively programmable to correspond to one of the first user input, the second user input, or the third user input.

18. A device, comprising:
a processor;
a touch input disposed on a rear face of the device and coupled to the processor, wherein processor when in operation selectively programs the touch input to correspond to an analog user input of the device or a digital user input of the device; and
an analog position encoder switch coupled to the touch input, wherein when the touch input is selectively programmed to correspond to the analog user input of the device, the analog position encoder switch in operation generates a signal in response to a user interaction with the touch input, wherein the signal comprises an unsigned n-bit integer that corresponds to a type of interaction as the user interaction with the touch input.

19. The device of claim 18, wherein the processor when in operation receives an indication to disable the touch input.

20. The device of claim 18, comprising a second touch input disposed on the rear face of the device and coupled to the processor, wherein the processor when in operation selectively programs the second touch input to correspond to an analog user input of the device, a digital user input of the device, or a second analog user input of the device.

* * * * *